US009619008B2

(12) United States Patent
North et al.

(10) Patent No.: US 9,619,008 B2
(45) Date of Patent: Apr. 11, 2017

(54) SYSTEM AND METHOD FOR DYNAMIC THERMAL MANAGEMENT IN PASSIVELY COOLED DEVICE WITH A PLURALITY OF DISPLAY SURFACES

(71) Applicant: Dell Products, LP, Round Rock, TX (US)

(72) Inventors: Travis C. North, Cedar Park, TX (US); Charles D. Hood, III, Cedar Park, TX (US); Lawrence E. Knepper, Leander, TX (US); Deeder M. Aurongzeb, Austin, TX (US); Jorge A. Abullarade, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 199 days.

(21) Appl. No.: 14/461,136

(22) Filed: Aug. 15, 2014

(65) Prior Publication Data
US 2016/0048363 A1    Feb. 18, 2016

(51) Int. Cl.
*G06F 3/14* (2006.01)
*G06T 1/20* (2006.01)
*G06F 1/32* (2006.01)
*G06F 1/16* (2006.01)
*G06F 1/20* (2006.01)

(52) U.S. Cl.
CPC .......... *G06F 1/3265* (2013.01); *G06F 1/1616* (2013.01); *G06F 1/1647* (2013.01); *G06F 1/1652* (2013.01); *G06F 1/1677* (2013.01); *G06F 1/206* (2013.01); *G06F 1/3206* (2013.01);

(Continued)

(58) Field of Classification Search
CPC .... G06F 3/1423; G06F 1/3265; G06F 1/3206; G06F 1/3218; G06F 1/3234; G06F 1/3215; G06F 1/329; G06F 1/206; G06F 1/1647; G06F 1/1616; G06F 1/1652; G06F 1/1677; G06T 1/20
See application file for complete search history.

(56) References Cited

U.S. PATENT DOCUMENTS

| | | | |
|---|---|---|---|
| 6,624,816 B1* | 9/2003 | Jones, Jr. | G06F 1/3218 345/503 |
| 6,727,824 B1* | 4/2004 | Miseli | G06F 1/1601 200/524 |

(Continued)

OTHER PUBLICATIONS

"Procedure for Developing Intuitive and Ergonomic Gesture for Man-Machine Interaction," Nielsen, Aalborg University, Laboratory of Computer Vision and Media Technology, Denmark, Technical Report CVMT 03-01, ISSN 1601-3646, CVMT, Aalborg University, Mar. 2003, pp. 1-12.

*Primary Examiner* — Amare Mengistu
*Assistant Examiner* — Jennifer Zubajlo
(74) *Attorney, Agent, or Firm* — Prol Intellectual Property Law, PLLC; H. Kenneth Prol

(57) ABSTRACT

An information handling system includes a primary integrated display platform and a secondary integrated display platform attached via a hinge, and including a passive cooling system, a dynamic thermal management system, and a processor. The information handling system further includes an application window locator system for determining a location of a software application display window running on the information handling system on the primary integrated display platform or the secondary integrated display platform.

20 Claims, 11 Drawing Sheets

(52) U.S. Cl.
CPC ............ *G06F 1/329* (2013.01); *G06F 1/3215* (2013.01); *G06F 1/3218* (2013.01); *G06F 1/3234* (2013.01)

(56) References Cited

U.S. PATENT DOCUMENTS

| | | | |
|---|---|---|---|
| 7,742,844 B2* | 6/2010 | Coxe, III | G06F 1/20 165/200 |
| 2005/0111183 A1* | 5/2005 | Pokharna | G06F 1/203 361/679.48 |
| 2006/0026535 A1 | 2/2006 | Hotelling et al. | |
| 2008/0167848 A1* | 7/2008 | Artman | G06Q 10/06 703/9 |
| 2010/0031203 A1 | 2/2010 | Morris et al. | |
| 2010/0077319 A1* | 3/2010 | Xu | G06F 3/0481 715/753 |
| 2011/0310030 A1* | 12/2011 | Mundt | G06F 1/1647 345/173 |
| 2012/0159200 A1* | 6/2012 | Ardron | G06F 1/206 713/300 |
| 2012/0176353 A1* | 7/2012 | Ishii | G06F 1/1616 345/204 |
| 2013/0080799 A1* | 3/2013 | Artman | G06F 1/206 713/300 |
| 2013/0321265 A1* | 12/2013 | Bychkov | G06F 3/017 345/156 |
| 2014/0325432 A1* | 10/2014 | Frederickson | G06F 3/0481 715/788 |

* cited by examiner

SYSTEM AND METHOD FOR DYNAMIC THERMAL MANAGEMENT IN PASSIVELY COOLED DEVICE WITH A PLURALITY OF DISPLAY SURFACES

CROSS REFERENCE TO RELATED APPLICATIONS

U.S. patent application Ser. No. 14/101,612, entitled "System and Method for Positioning an Application Window Based on Usage Context for Dual Screen Display Device," filed Dec. 10, 2013, the disclosure of which is hereby expressly incorporated by reference in its entirety and assigned to the assignee hereof;

U.S. patent application Ser. No. 14/066,484, entitled "System and Method for Display Power Management for Dual Screen Display Platform," filed Oct. 29, 2013, the disclosure of which is hereby expressly incorporated by reference in its entirety and assigned to the assignee hereof;

U.S. application Ser. No. 14/078,775, entitled "Dynamic Hover Sensitivity and Gesture Adaptation in a Dual Display System," filed Nov. 13, 2013, the disclosure of which is hereby expressly incorporated by reference in its entirety and assigned to the assignee hereof.

FIELD OF THE DISCLOSURE

This disclosure generally relates to dual display information handling systems having a plurality of display platforms and one or more display devices for visual transmission of information to a user, and more particularly relates to active thermal management of operation of an information handling system with a passive cooling system that operates on multiple integrated display platforms with a plurality of orientations.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as clinical healthcare data storage and distribution, financial transaction processing, procurement, stocking and delivery tracking, provision of data services and software, airline reservations, enterprise data storage, or global communications. Information handling systems may include a variety of hardware and software components that may be configured to process, store, and communicate information and may include one or more computer systems, data storage systems, and networking systems. Additionally, information handling systems may have two or more display platforms with one or more display screens for output of images and for input such as by touch screen operation or active pen input.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
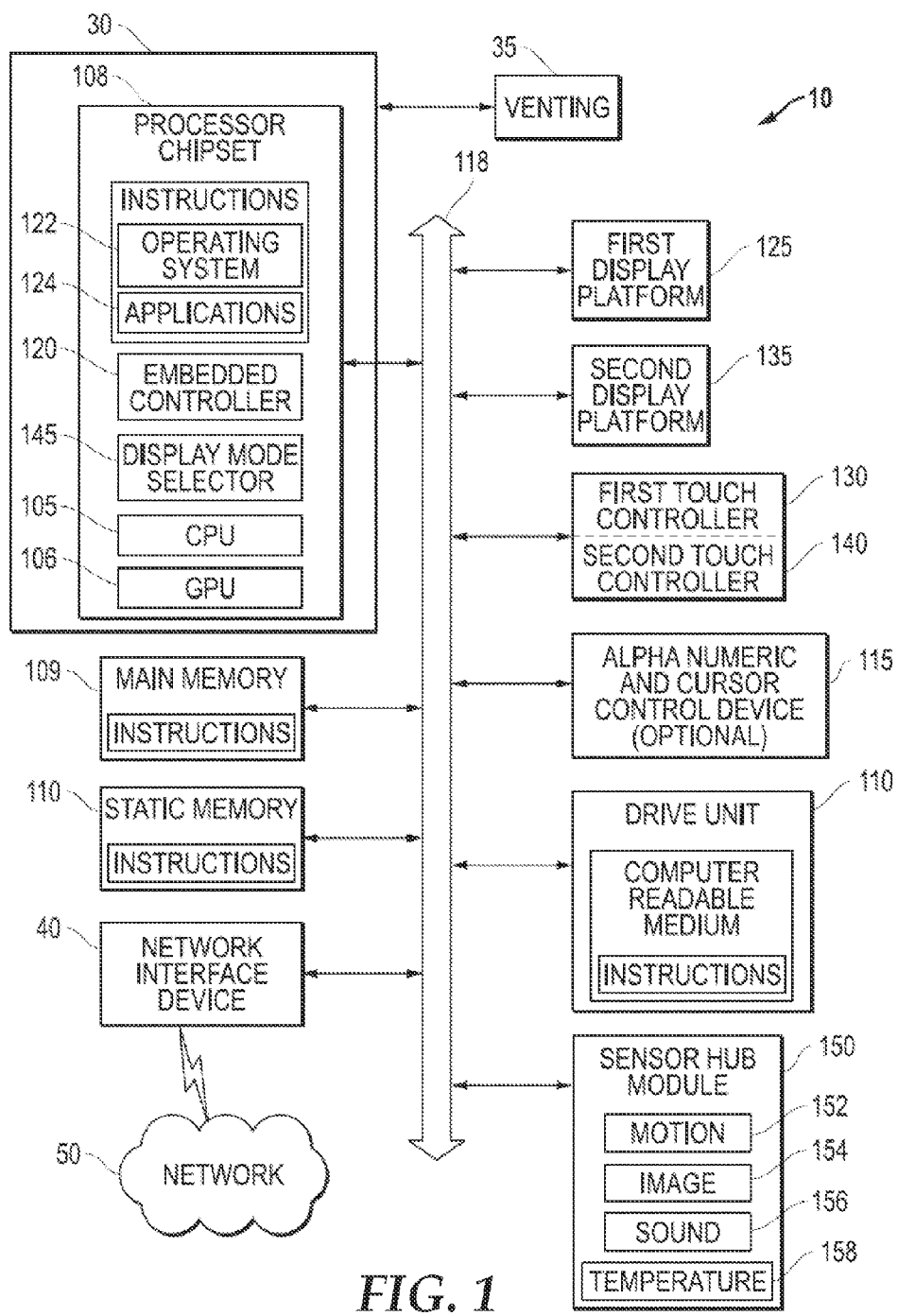
FIG. 1 is a hardware block diagram illustrating a dual display platform information handling system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Most businesses and other enterprises have sophisticated computing systems used for facilitating internal operations and for storing sensitive data, protecting access to such data, and securely communicating outside the enterprise's network, for example to exchange information with business partners, healthcare providers or the similar data exchange partners. These enterprise systems also interface with individual users. Individual users also use sophisticated computing systems to facilitate working software application contexts such as running office applications for database creation and word processing, note taking, accessing internet data applications, gaming, video playback entertainment, video and voice communications, email and other electronic communication, websurfing, music, mobile applications, and other media accesses. Much of present day information exchange is conducted electronically, via communications networks. Currently, a high degree of media entertainment and other applications are utilized and accessed electronically by users. Thus, there is an increased need for extended display capabilities to facilitate broad range of usage including to enable multitasking by users. Additionally, traditional information handling system input devices such as keyboards and mouse systems are giving way to visual input interfaces such as touchscreens, hover detection, and motion sensing technologies. In many instances, it is substantially beneficial to implement a system with multiple display platforms having one or more display screens configurable in many orientations to interact with an information handling system.

Multiple display platform information handling systems may be configurable in a plurality of orientations for utilization of and interaction with the information handling system. Hereinafter, the terms dual display screen information handling system or dual display information handling systems, or dual display platform information handling system each may refer to devices with a single display screen such as a flexible display that is layered over or mounted on all or part of two or more display platforms, or each may refer to devices with two or more fully integrated display screens, or each may refer to devices with a plurality of separate display screens that are modularly connectable to the information handling system or to one another. The terms screen or display screen may also refer to a portion of a single display screen, such as a flexible display screen, with a plurality of portions or to an individual display screen. Screens or display screens may herein refer to portions of a display screen and may be mounted on or integrated into one or more display platforms. It is understood that while two display platforms are disclosed in several embodiments herein, embodiments including a plurality of display platforms including three or more display platforms in hinged relationship is also contemplated for the systems and methods disclosed herein. One of ordinary skill would understand implementing the systems and method embodiments discussed herein for these additional embodiments.

Optimal utilization of multiple display platforms is desirable to facilitate usage of the extended display capabilities of an information handling system with two or more display screens. Display screens require substantial energy for operation which, in a mobile device environment, may heavily tax system performance and battery life. Moreover, mobile device information handling systems may be passively cooled due to space and power constraints. As such, cooling may be limited at high levels of operation including with a device with multiple display platforms or even with multiple display screens. Orientation of dual display platform information handling systems and the context of the applications running thereon are relevant to the user experience. Orientation to gravity and between display platforms impacts passive cooling capacity and system thermal control needs to be dynamic to adjust to the varying cooling capacities for each orientation. The dual display platform information handling system may determine or monitor a thermal profile of the information handling system or one or both of the display platforms. Strategies for optimizing the cooling efficiency of the passive cooling systems associated with the information handling system may be used to minimize user disruption of dual display platform information handling system while enabling sufficient cooling via the passive cooling system during high performance usage. This is referred to as dynamic thermal management of the passively cooled information handling system.

A set of instructions operating on a processor which may include main processing unit of the information handling system or a dedicated ASIC or other processor may execute dynamic thermal management instructions and access stored policies to improve operation of the information handling system during periods of active operation. The aforementioned is an example embodiment of a dynamic thermal management system. The thermal profile may also include external temperature measurements.

The dynamic thermal management system may also monitor temperature levels at various points internally and externally to the information handling system and the plural display platforms. These temperature measurements are included in a thermal profile of the device. Temperature may be monitored via a thermocouple or other temperature sensing devices used in the art for temperature measurement of information handling systems. The dynamic thermal management system may also monitor or receive data relating to power draw levels or processor operation levels to determine anticipated power changes and corresponding thermal changes to the information handling system as part of a thermal profile. For example, the thermal profile data may include power draw measurement levels from various power sources or the power consumption levels at selected components of the information handling system. Selected components include those where power consumption may be expected to be substantial. For example, consumption by central processors or graphics processors. Additional factors may also be monitored as part of the dynamic thermal profile as described further herein.

Although temperature is essentially the consequence of power consumption and, moreover, dynamic thermal management techniques employ power dissipation and usage aspects, there are significant differences between thermal aware design/management and power aware design/management. For example, system dynamic thermal profiles cannot be characterized by power consumption profiles alone. External thermal influences such as ambient temperature, for one, may affect thermal profiles differently from power consumption influences. Furthermore, orientation to gravity as well as position of each display platform to the adjacent display platform can directly impact the dynamic thermal profile. Moreover, power consumption may change instantaneously while temperature may be cumulative of power and gradual changes of temperature. Temperature may also spike or dip, although the changes may not always directly correspond with changes in power consumption.

Orientation changes to the passive cooling efficiencies may further worsen cooling efficiency of a dual display platform system. Airflow within the system via the location of passive venting, heat spreaders, proximity of heat pipes between display platforms or other passive cooling structures may be affected by orientation of the dual display platform information handling system. This may have a direct effect on cooling efficiency of the dual display platform information handling system. Tolerable threshold temperatures before implementation of dynamic thermal management techniques may be influenced by orientation of dual display platforms relative to one another.

Policies for optimizing cooling efficiency may include strategies for reducing load on processing or power consumption to reduce heat production in the system or to accommodate passive cooling altered by orientation. As discussed further herein, several options may be employed to reduce processing, graphics processing, light generation, power draw or other functions in the dual display platform information handling system upon a thermal profile threshold being met. These strategies may include movement of application windows to a secondary portion of a display screen or to a secondary display screen in the dual screen platform information handling system. Additionally, the second display screen or portion of a display screen associated with the secondary display platform may be reduced operationally to save power and reduce heat generation. For example, this may include dimming reducing refresh rates for the secondary portion of the display device or secondary display screen operatively coupled to the secondary display platform.

Application windows moved to the secondary display screen or screen portion may have a lower priority operating state rank. In other words, software applications with a lower operating state rank may be moved without substantially affecting user experience during time of elevated activity and heat profiles. In other words, lower priority operating state rank applications may not be a critical application, such as an ongoing video communication or video or audio streaming. Or they may be applications not being actively used, such as a video or software download.

The dynamic thermal management of the passively cooled dual display platform system utilizes a thermal profile to determine strategies to reduce power and heat generation while preserving user experience quality during times of high activity and elevated temperature. The thermal profile may include measured temperature levels internal to one or a plurality of display platforms.

Policies for optimizing cooling efficiency of a dual display platform information handling system and therefore location and prioritization of software display windows and strategies for power draw reduction and reduced heat generation during high activity operation are described in several embodiments herein. Several factors are relevant in determining policies for optimizing passive cooling. Factors may include ranked priority of software applications, orientation mode of a dual display information handling system, determination of the location of a user or multiple users with respect to the display screens of a dual screen device, and status of the system thermal profile.

FIG. 1 shows a dual display platform information handling system 10 including conventional information handling systems components of a type typically found in client/server computing environments. FIG. 1 shows the information handling system 10 capable of administering each of the specific embodiments of the present disclosure. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a tablet, a PDA/smartphone, a consumer electronic device, a network server or storage device, a switch router, wireless router, or other network communication device, or any other suitable device and may vary in size, shape, performance, functionality, and price.

The information handling system may include memory, one or more processing resources such as a central processing unit (CPU) 105 and related chipset(s) 108 or hardware or software control logic. Additional components of system 10 may include main memory 109, one or more storage devices such as static memory or disk drives 110, an optional external input device 115 such as a keyboard, and a cursor control device such as a mouse, or one or more video displays 125 and 135. In the shown embodiment, the device is a dual display platform with displays 125 and 135. The information handling system may also include one or more buses 118 operable to transmit communications between the various hardware components. The main memory unit 109 and static memory drive unit 110 may include a computer-readable medium in which one or more sets of instructions such as software can be embedded. The static memory drives 110 also contain space for data storage. Further, the instructions may embody one or more of the methods or logic as described herein. In a particular embodiment, the instructions may reside completely, or at least partially, within main memory 109, the static memory or disk drive unit 110, and/or within the processor chipset(s) 108 during execution by the system 10. The main memory 109 and the processor chipset 108 also may include computer-readable media.

Chipset 108 is shown to be operatively coupled to a passive cooling system 30. Passive cooling system 30 may be operatively coupled to other portions of the dual display platform device. High heat generating components such as the chipset components are likely to be coupled to cooling elements in an example embodiment. Passive cooling elements are used in mobile devices to conserve space and power that an otherwise active cooling system would require. Passive cooling system 30 may include elements such as passive venting 35, heat spreaders, heat pipes and heat conductive adhesives and layers. For example, the proximity of heat pipes to processing structures and power supply units is understood to provide efficient ways to remove heat from the heat generating elements and out to the usually cooler external environment. One example includes one or more passive venting areas 35 on the dual display platform device. Heat pipes and venting 35 between display platforms or other passive cooling structures may be affected by orientation of the dual display platform information handling system.

System 10 represents a mobile user/client device, such as a dual screen mobile tablet computer. System 10 has a network interface device 40, such as for a wireless cellular or mobile networks (CDMA, TDMA, etc.). WIFI, WLAN, LAN, or similar network connection, enabling a user to communicate via a wired or wireless communications network 50, such as the Internet. In a networked deployment, dual display information handling system 10 may operate in the capacity of a server or as a client user computer in a server-client user network environment, or as a peer computer system in a peer-to-peer (or distributed) network environment. System 10 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, system 10 can be implemented using electronic devices that provide voice, video or data communication. Further, while a single information handling system 10 is illustrated, the term "system" shall also be taken to include any collection of systems or sub-systems that individually or jointly execute a set, or multiple sets, of instructions to perform one or more computer functions.

System 10 may be configured with conventional web browser software. The web browser, may include for example Microsoft Corporation's Internet Explorer web browser software, Firefox or similar such browsers to allow the user to interact with websites via the wireless communications network 50.

System 10 may include several sets of instructions to be run by CPU 105 and any embedded controllers 120 on system 10. One such set of instructions includes an operating system 122 with operating system interface. Example operating systems can include those used with typical mobile computing devices. Additional sets of instructions in the form of multiple software applications 124 may be run by system 10. Dual display information handling system 10 can include a set of instructions that can be executed to cause the computer system to perform any one or more of the methods or computer based functions disclosed herein. System 10 may operate as a standalone device or may be connected such as using a network, to other computer systems or peripheral devices. These software applications 124 may enable multiple uses of the dual display information handling system as set forth in more detail below.

System 10 includes a first or primary display platform 125 and a second display platform 135. First display platform 125 and second display platform 135 may each house a display screen. Alternatively, one display screen such as a flexible display screen, may be supported by both the first display platform 125 and the second display platform 135. With a single flexible display screen, the display screen may be partitioned into two or more portions. For example, the flexible display screen may be partitioned such that one half is supported by the first display platform 125 and the other half is supported by the second display platform 135.

As shown, system 10 may further include dual video display screens 125 and 135, such as liquid crystal displays (LCD), organic light emitting diode (OLED) displays, flat panel displays, or solid state displays. Dual video display screens 125 and 135 may also be a single display screen with a plurality of portions such as a flexible OLED display screen. The single display screen may have separately controllable portions controllable via the same GPU 106 or controller or independent GPUs 106 or controllers.

Each display screen has a display driver operated by one or more graphics processing units (GPUs) 106 such as those that are part of the chipset 108. Each display screen also has an associated touch controller 130, 140 to accept touch input on the touch interface of each display screen. In the example embodiment with one partitioned display screen, one touch controller may control the single display screen or plural touch controllers may be allocated for each partition. It is contemplated that one touch controller may accept touch input from a display screen on display platforms 125 and 135, or as shown in the current embodiment, two touch controllers 130 and 140 may operate one or more display screens or display screen portions respectively.

The one or more display screens supported by or operatively attached to the first display platform 125 and the second display platform 135 may also be controlled by the embedded controller 120 of chipset 108. Each GPU 106 and display driver is responsible for rendering graphics such as software application windows and virtual tools such as virtual keyboards on the display screen or screens of display platforms 125 and 135. Control of the location and positioning of these windows may be set by user input to locate the screens or by control setting default. In several embodiments described herein, control of the location for rendering for software application windows and virtual tools in the dual displays may be determined by an application window locator system as described further in the embodiments herein. The application window locator system determines operating state rank of running software applications and determines whether and where to display application display windows and virtual tools based on relative orientation, state of usage information, and thermal profile data as determined by a dynamic thermal management system. Windows may include other forms of display interface with software application besides a window. It is contemplated that tiles, thumbnails, and other visual application access and viewing methods via a display are contemplated to be considered windows. Virtual tools may include virtual keyboard, virtual touchpad or controller, virtual buttons and other input devices rendered via a display screen and accepting feedback via a touch control system.

In another example of dual display platform control via the disclosures herein, the power to the first display platform 125 and the second display platform 135 is controlled by an embedded controller 120 in the processor chipset(s) which manages a battery management unit (BMU) as part of a power management unit (PMU) in the BIOS/firmware of the main CPU processor chipset(s). These controls form a part of the power operating system. The PMU (and BMU) control power provision to the display screens and other components of the dual display information handling system. The PMU may play a role in determining or reporting power draw levels to various components of the system. For example, power draw levels by one or more central processing units 105, embedded controllers 120, and graphics processing units 106. This data may be reported to the dynamic thermal management system and become part of the thermal profile along with temperature measurement data.

A display mode selector 145, in connection with an application window locator system and dynamic thermal management system as described in more detail below, determines priority of concurrently running software applications and how to automatically locate software application display windows and virtual tools between the dual screens, or portions of a display screen, via instructions executed on the chipset 108 such as CPU 105 and embedded controller 120. Display mode selector 145 may also determine commands issued to the GPU and or display drive device drivers for implementing power savings strategies to reduce heat generation in connection with the dynamic thermal management system. Determining location of concurrently running software applications may be based upon orientation of the two display platforms 125 and 135 as well as the priority rank of software applications 124 currently running, their activity and status. Determining which applications 124 are running determines a working software application context. Alternatively, the application window locator and/or the dynamic thermal management system may operate on an embedded controller 120 separate from the main CPU chipset(s) 108. Additionally, the power management application may receive state of usage activity input from device state sensors for applications. For example, lower priority ranked applications may be moved to a secondary display screen or display screen portion associated with a second display platform. The second display platform display screen may then be reduced in brightness or other operational capacity to lower power draw and reduce heat generation for lower priority software applications running on the information handling system.

System 10 of the current embodiment has a system sensor module 150. Various orientation sensors are included in this module to assist with determining the relative orientation of the dual display information handling system. Subcategories of orientation sensors include motion sensors 152, image sensors 154, and sound sensors 156. Other orientation sensors are contemplated as well including state of usage activity sensors as discussed in more detail below with FIG. 2. Sensor system module 150 is a sensor hub, or an data acquisition device, that collects raw data from connected orientation sensors, and organizes and processes data received from the connected sensors. The data acquisition device may also be referred to as a data acquisition device. The sensor hub also processes raw sensor data to groom the raw sensor data into a useable form of positional analysis for the dual display information handling system and its display screens. Such a sensor hub may be an independent microcontroller such as the STMicro Sensor Fusion MCU as well as other microcontroller processing systems known to persons of ordinary skill. Alternatively, it is contemplated that the sensor and fusion hub may be integrated into a core processing chipset such as CPU systems for mobile devices as available from Intel® corporation or may utilize ARM Core processors that serve as single or multiple core processors in alternative chipset systems. The sensor hub may communicate with the sensors and the main CPU processor chipset via a bus connection such as an Inter-Integrated Circuit (I2C) bus or other suitable type of multi-master bus connection.

The sensor data from the sensor hub is then further groomed by the power management application and the display mode selector 145. A relative orientation of the dual display information handling system in space, the orientation of the two display screens with respect to one another, consideration of state of usage activity data, and working software application context are determined by the application window locator system and the display mode selector 145 at CPU 105 or embedded controller 120. This relative orientation data of the dual display information handling system, the rank of software applications running, the rank of the state of the operating state for the software applications, and the working software application context are used by application window locator system and display mode selector 145 to determine locations of software application display windows and virtual tools among the display screens.

System 10 may also include temperature sensors 158 located internal or external to the dual display platform information handling system. Temperature sensors 158 may report thermal data to sensor hub module 150 as shown in the present embodiment of FIG. 1. Alternatively, temperature sensors 158 may report internal and external thermal data directly to a dynamic thermal management system operating via processor chipset 108. Temperature sensors 158 may include analog and digital temperature sensors such as thermistors, thermocouples, thermal diodes, resistance thermometers, silicon bandgap temperature sensors, and other temperature sensors as is understood in the art. Example digital temperature sensors include digital temperature sensor integrated circuit products such as those offered by STMicroelectronics, Analog Devices, Inc., and other manufacturers.

Additionally, system 10 may include optional external input device 115 such as a keyboard, and a cursor control device such as a mouse. System 10 can also include a signal generation device or receiving device, such sound sensors 156, remote control, and a network interface device 40. Typically, system 10 may also include microphones and speakers for audio input and output (not shown). The microphones and speakers are connected through an HDA Codec such as the Realtek ALC 5642 or similar such codec. Data from the microphones may serve motion sensing using a Doppler Effect detection of display screen locations. This is discussed further below.

Figure 2:
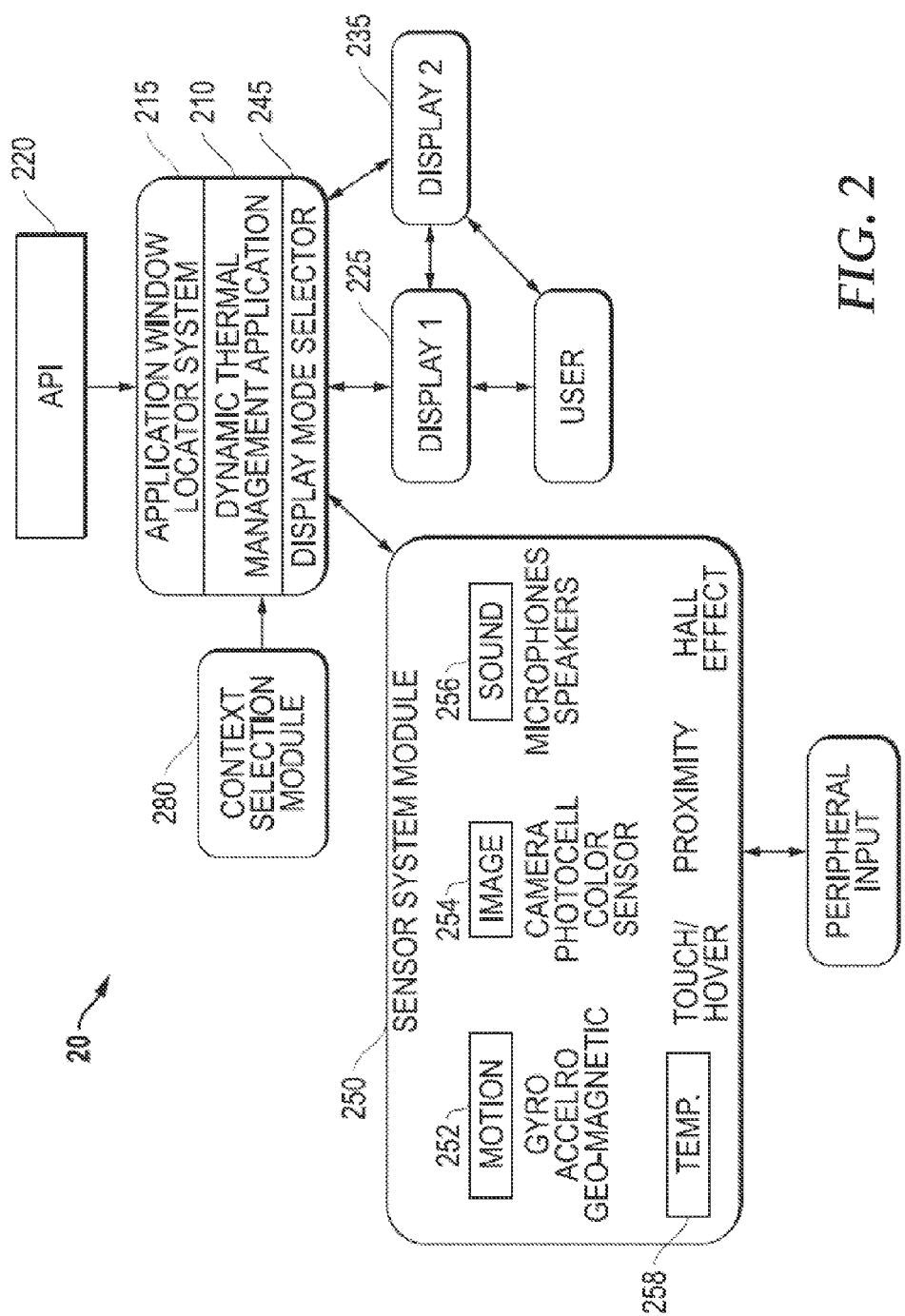
FIG. 2 is a block diagram illustrating the sensors module and working software application context selection module integrated with the power management of a dual display platform information handling system according to an embodiment of the present disclosure.

FIG. 2 illustrates a system block diagram of a dual display platform dynamic thermal management system 20 including sensor module 250 and context selection module 280. Also shown are the first display platform 225 and the second display platform 235 integrated into the information handling system of the current embodiment. The dual display platform dynamic thermal power management system 20 includes dynamic thermal management application 210, an application window locator system 215, and display mode selector 245 that comprises a set of instructions run on CPU 105 or embedded controller 120 in the chipset(s) 108. The dynamic thermal management application 210, the window locator system 215, and the display mode selector 245 interface with the application programming interface (API) 220 found in the information handling system software to coordinate various software applications. The API may coordinate the display mode selector 245, sensor hub input data, other independent sensor input types such as temperature sensors, power draw detectors, camera or touch hover detection applications, display platform drivers, PMU/BMU applications controlling power, and the window locator system application 215. Further, display mode selector 245 interfaces with API 220 and manages commands to the GPU and display platform drivers to render and locate the software display windows and virtual tools, or to deploy power savings strategies for one or both display screen or display screen portions of display platforms 225 and 235.

The dynamic thermal management application 210, power management applications, the application window locator system 215, and display mode selector 245 receive data from the sensor system module 250. Sensor system module 250 sources includes thermal profile data including temperature measurements and power draw measurements. Sensor system module 250 may include an data acquisition sensor hub as described herein. Additional data is received from the sensor system module and data acquisition sensor hub 250 from some or all of the orientation sensors shown. The orientation sensor types include motion sensors 252, image sensors 254, sound sensors 256, temperature sensors 258, and other sensors. Some orientation sensors are connected through the sensor hub or data acquisition device and system. Other sensors may directly provide data to the dynamic thermal management application 210, the application window locator system 215, or the display mode selector 245. For example, digital temperature sensors 258 may report directly to the dynamic thermal management application 210 instead of via sensor system module hub 250. In another example, the camera system and detection of gaze or presence of a user can operate on a different set of drivers and data be groomed by a software application running on the chipset(s) 108 processors to interpret camera input.

Motion sensors 252 may include one or more digital gyroscopes, accelerometers, and magnetometers. Motion sensors 252 may also include reference point sensors. For example, a geomagnetic field sensor may determine position of one or both display screens of the dual-screen information handling system and or the overall dual display information handling system device itself. This positional information may provide x-axis, y-axis, and z-axis positional information of the dual display information handling system relative to magnetic north pole, and there for a reference point of the device position. In one embodiment, two geomagnetic field sensors provide x-axis, y-axis, and z-axis positional information for each display screen of the dual display information handling system. With this data, the system determines the relative position of the two display platforms to one another in orientation.

Also, a digital gyro and accelerometer may be used to detect motion and changes in position. These sensors may provide a matrix of data. In an example embodiment, the azimuth or yaw, pitch, and roll values of the device are indicated by the raw sensor data. The raw orientation data for the entire dual screen device may be relevant to the dual display power management system 210 or software window locator system 215. In another embodiment, determination of azimuth, pitch, and roll data may be made of individual display platforms 225 and 235 in the dynamic thermal management system 20. In a further embodiment, the two individual display platforms are integrably hinged together along one side of each display platform. Thus, relative positions of each individual display platform 225 and 235 are important input data to determining the logical location of application display windows as well as dynamic thermal management described herein.

In connection with a reference point, such as magnetic north as provided in one embodiment by a geomagnetic field sensor, the azimuth can be determined as a degree of rotation around a z-axis. Note this is different from hinge azimuth angle discussed further below. In an embodiment, the azimuth may be the value of the z-axis relative to the device y-axis as positive angle values between 0° and 360°. It is understood that a different range of values may be assigned in different embodiments.

Based on a reference point such as provided by a geomagnetic field sensor, pitch may be determined as a degree of rotation around the x axis. In an example embodiment, the angle values may range from positive 180° to negative 180° relative to the y-axis, although other value ranges may be assigned instead.

Roll is also based on the reference value, for example that established by a geomagnetic sensor. Roll may be considered to be rotation about the y-axis and its values may range from positive 90° to negative 90°. Again, the value ranges assigned can vary for each of the azimuth, pitch, and roll as long as a set of values is used to define orientation parameters in three dimensional space.

The matrix of raw sensor data from the geomagnetic field sensor and the gyro and accelerometer sensors may be processed partly by a sensor hub or data acquisition device to provide orientation data for the dual display platform information handling system device. The sensor hub performs a fusion of data signals received from either a single sensor or multiple sensor devices. As described above in reference to FIG. 1, the sensor hub also processes raw sensor data to groom the raw sensor data into a useable form of positional analysis for the dual display information handling system and its display platforms. In the example embodiment, the sensor hub is an independent microcontroller such as the STMicro Sensor Fusion MCU.

No more than three orientation sensors are needed to determine orientation mode, which is also referred to herein as display mode. A reference sensor and a motion sensor associated are attached to one display platform to determine its orientation. A second sensor which is either another reference sensor or a motion sensor associated with or attached to the second display platform to provide enough information of location or movement of the second display platform relative to the first display platform to determine the overall orientation mode of the dual display platform information handling system. Algorithmic calculation of the sensor data from the first display platform, such as a geomagnetic field reference sensor and an accelerometer motion sensor, may be used to determine the orientation of the first display platform according to a geomagnetic field or other reference point. Additional algorithmic calculations of movement data or differences in reference point data from the second display platform are used to determine position or orientation of the second display platform in space relative to the first display platform. The fixed location of the hinge and determination of the position of and relative angle between each of the two display platforms also yields positional information on a hinge azimuth angle. The hinge azimuth angle, different from the raw azimuth z-axis measurement discussed above, relates to the orientation of the hinge axis relative to a detected users viewing line or relative to the viewing line most likely to be used by a viewer based on the dual display platform's current configuration.

In one example embodiment, two digital gyroscopes may be used, one for each display platform of the dual display information handling system, and a geomagnetic field reference sensor may be used in association with either display platform. In yet another example embodiment, two accelerometers may be used in addition to a reference sensor, one for each display platform of the dual display information handling system. Some sensor types may be combination sensor devices in certain embodiments as is known in the art. For example, a motion sensor may be used that combines the functions of a digital gyroscope and accelerometer to detect motion. Thus, one accelerometer and one digital gyroscope or two gyro-accelerometer combination devices may be used along with at least one reference sensor to determine the dual display information handling system orientation. Any combination of the above reference sensors and motion sensors may be used in a three sensor embodiment to determine orientation of the display platforms (e.g. relative angle) and the hinge azimuth angle.

It is contemplated that more sensors associated with each of the first and second display platforms provide more data permitting increased accuracy in determination the dual display platform information handling system orientation. This has trade-offs however in materials cost, space occupancy, and power consumption. Use of dual sensor types in each display platform for the dual display platform permits two sets of processed orientation data to be developed by the data acquisition device. With these two sets of data, display mode selector 245 of the central processor or the embedded controller may determine changes in movement of each display platform of the dual display platform. These movement changes indicate relative position of these two display platforms 225 and 235 to one another. This provides information permitting the system to understand the location and movement of each of the two display platforms relative to one another as well as their position and movement in space overall. Such additional capability may provide more precise determination by the display mode selector of the intended display mode of the dual display information handling system.

The relative measurements of position in space relative to a reference point may be further processed relative to measurements of position from other sensors. For example azimuth, pitch, and roll may establish the position in space of one display platform. Then data from one or more sensors on a second display platform such as a gyroscope, may indicate a different azimuth, pitch, and roll for the second display platform. With position of the two display platforms and a known hinge point (or points), the system determines a relative angle between the first display platform and a second display platform. Similarly, the system for determining orientation of the dual display platform will know the location of a fixed hinge axis and based on positional information of the two display platforms in space. Thus, the dual display power management system determines the hinge azimuth angle relative to the probable viewing line of a user. The viewing line of a user may also be detected with a camera detection system or other proximity sensor to recognize the location of a user relative to the dual display platform.

Other techniques are also contemplated to determine relative position and movement of two display platforms integrated into a dual display information handling system. For example, Doppler Effect sound sensors 256 may typically include one or more microphones and speakers used in connection with Doppler Effect calculations to determine relative position of two display platforms in a dual display information handling system. A transmitter and microphone receiver can detect a Doppler shift in sound or ultrasound signals to measure distance or location of the two display platforms integrably hinged. In one example, the Doppler Effect sensors may operate in the 0-40 kHz range to detect relative location of the hinged dual platforms in an open configuration.

Image sensors 254 may include a camera, photocell or color sensor. A photocell may detect the open or closed state of a dual display information handling system by determining hinged platforms are no longer in a closed position when light is detected by the photocell. Additionally, the photocell may detect ambient light levels in determining brightness levels of one or more display platforms. A photocell may even be used to indicate when one display platform is oriented face down on a surface such as a table while the other display platform may be actively displaying.

A camera may be used as an image sensor to provide several types of feedback. It may be used as a light sensor similar to a photocell. A camera may also be used to facilitate a reference point for orientation by detecting the presence and location of a user in front of one or more display platforms of a dual display information handling system. Location of a user relative to one or both display platforms provide a rough user viewing vector that may be used to determine display usage mode by the display mode selector 245. The camera may be tasked to sense the position of a user around the two platforms (for example, directly in front, above, below, to the right, or to the left of the plane of the display platform) as well as using facial recognition capability as is known to the art to determine the orientation of the person's face. This information enables the system to correctly orient both displays on the display platforms according to a viewing line of sight (or viewing vector) based on position and orientation of the user. The displays on each display platform may be oriented in landscape page orientation or portrait page orientation as well as determining which side should be the top of the display for each platform relative to the viewer.

A camera may also be used with gaze detection to determine which platform in a dual-platform information handling system is actively being viewed by a user. Determining which platform between the dual display platforms is being actively viewed provides additional data for the display mode selector and the dual display power management system application to determine power saving implementations that may be appropriate. Eye tracking and gaze technology implementations are available in the art from companies such as Synaptics, Inc. and Tobaii Technologies. Description of this technology is found at http://www.synaptics.com/about/press/press-releases/tobii-and-synaptics-unveil-concept-laptop-integrates-eye-tracking-and-touch (press release Jun. 25, 2013). Use of eye tracking and gaze technology in the present disclosure permits control over determination of which display platform is active in a dual display information handling system. The active display platform may then be designated as primary in an embodiment. Location of an application display windows may be selected for a non-active display platform depending on the application being used and physical orientation of the system. The non-active display may be designated as a secondary display platform. Also, power may be reduced to a non-active display screen depending on the application being used and physical orientation of the system.

Temperature sensors 258 may include a variety of digital temperature measurement elements including thermistors, thermocouples, and integrated circuit temperature measurement systems is known in the art. Data from temperature sensors 258 may be fed through a sensor system module hub 250. Temperature sensors 258 may be located to detect temperature at various points within the dual display platform information handling system. In other embodiments additional temperature sensors 258 may be located on external surfaces of the information handling system to determine if temperature may reach or exceed levels unacceptable for human touch. Internally, temperature sensors 258 may be strategically located near heat generating elements including processing and controllers, graphics processing, and power supply units. In other embodiments temperature sensors 258 may be located internally near passive cooling system elements to gauge their real-time effectiveness in controlling internal temperature spikes.

In addition to motion sensors 252, image sensors 254, and sound sensors 256, temperature sensors 258 other sensors may be utilized by the dynamic thermal management application. Other sensors may include a variety of state of usage activity sensors. For example, touch or hover sensors may detect which display platform is actively being used. Proximity sensors may detect the location of a user relative to one or both display platforms. Proximity sensors in one or both display platforms may detect the position of a user around the two display platforms (for example, directly in front, above, below, to the right, or to the left of the plane of the display platform) and thus infer the viewing vector based on the position of the user or users. Proximity sensors may be a variety of types including infrared, radiofrequency, magnetic, capacitive or other techniques used to detect the surroundings of the information handling system. Similar to the camera, this proximity sensor information enables the system to correctly orient both displays on the display platforms according to a viewing line of sight (or viewing vector) based on position and orientation of the user. The displays on each display platform may be oriented in landscape page orientation or portrait page orientation as well as determining which side should be the top of the display for each platform relative to the viewer. As described further below, a tilt of one or both display platforms may also orient the display on the display platform via a gyroscope or accelerometer sensor providing this state of usage activity information.

Another state of usage activity sensor is a Hall Effect sensor that may detect when a magnet, of certain polarity and strength, is in proximity to the sensor. It is used to detect the closed position of a device with two sides. For example, a Hall Effect sensor may determine when two integrably hinged display platforms are closed onto one another so that a magnet in one platform triggers a Hall Effect sensor in the second display platform. Alternatively, a different Hall Effect sensor may determine if the hinged display platforms are open to an orientation of 360° so that the back sides of the display platforms are in proximity such that a magnet located with one display platform triggers the Hall Effect sensor of the other.

Hall Effect magnets and magnetic sensors may be deployed as a type of motion sensor 252 although it is also a position or state sensor. It is known in the art that a relative angle between a magnetic field source of known polarity and strength may be determined by strength and change to a magnetization vector detected by magneto-resistive detectors of a Hall Effect sensor. Thus, motion and relative angle may also be detected by the Hall Effect sensors. Other detectors are also contemplated such as a hinge angle detector that may be mechanical, electromechanical or another detecting method to determine how far the hinge between the two display platforms has been opened. Such detectors are known in the art.

The context selection module 280 determines what software applications are operating on the dual display platform information handling system. Categories of working software application contexts such as running office applications for database creation and word processing, note taking, accessing internet data applications, gaming, video playback entertainment, video and voice communications, email and other electronic communication, websurfing, music, mobile applications, and others are grouped according to similarities in usage on a dual display platform information handling system. Websurfing and use of some types of mobile applications may have similar usage on a dual display platform device.

The context selection module 280 detects active software applications and ranks the software applications based on a variety of factors. Priorities may be set via a priority policy table described further below and utilized by the window locator system application to arrange display locations of software display windows and virtual tools. Some software applications will take priority based on an operating state of the software which is determined from a context selection module 280. For example, an operating state may include whether a videoconference call application or a voice call application is receiving a current call. Another operating state may include a software application requesting input via a virtual tool such as a virtual keyboard. Yet another operating state may be a software application actively running or being actively used versus a software application downloading data. Additional operating states are contemplated for assessment by the context selection module 280 in determining the working software application contexts for one or more software applications running on a dual display platform information handling system. The operating states may be ranked by the context selection module 280 as discussed further herein.

The working software application context data is provided to the dynamic thermal management application 210, display mode selection module 245 of the application window locator system 215 along with sensor data for orientation and state of usage activity data for determination of dynamic strategy to assist the passive cooling system for the dual display platform information handling system and by locating the software application display screens and virtual tools for display.

Figure 3:
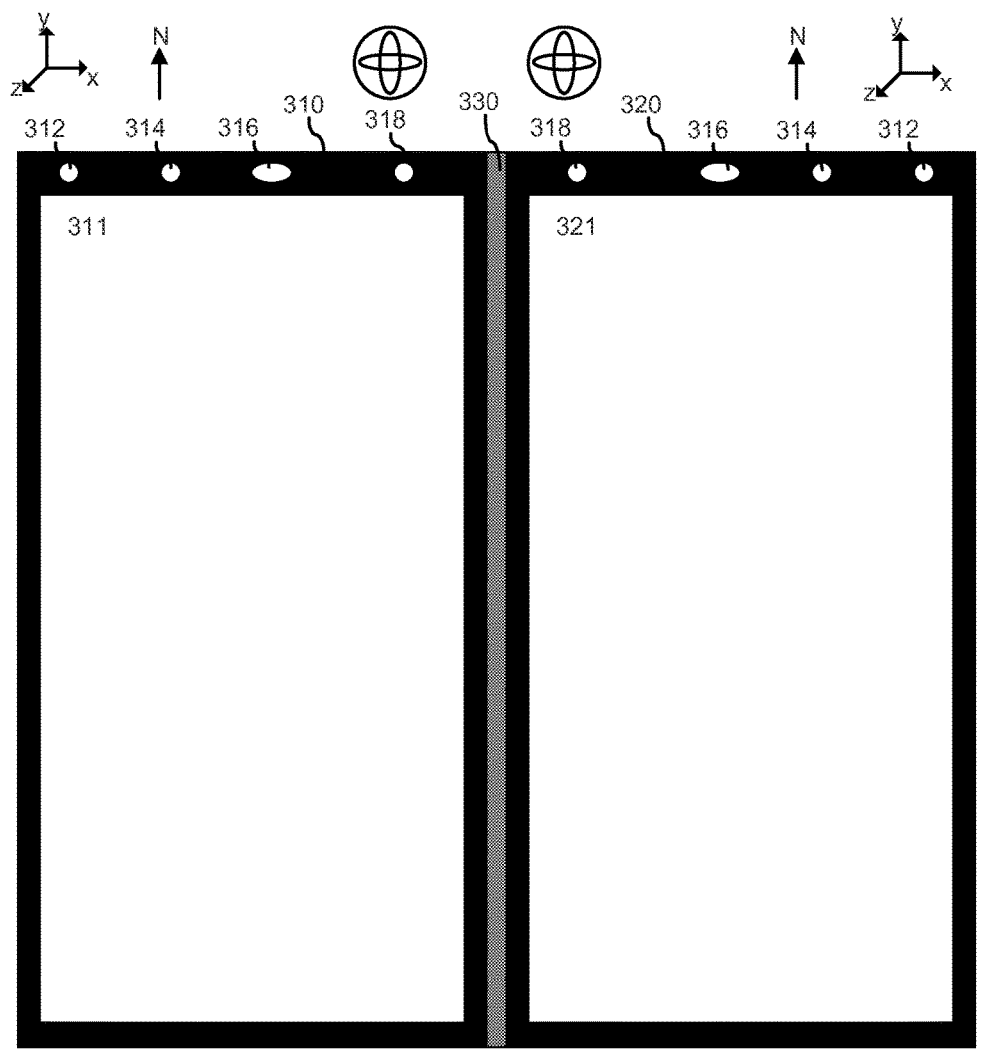
FIG. 3 illustrates an example dual display platform information handling system according to an embodiment of the present disclosure.

FIG. 3 shows an example of a dual display platform information handling system with two hinged display screens according to an embodiment of the invention. The dual display platform information handling system 300 has a first display screen 311 in a first display platform 310 and a second display screen 321 in a second display platform 320 in the disclosed embodiment. In one embodiment, first display platform 310 and second display platform 320 may comprise housings to contain first display screen 311 and second display screen 321 respectively. Accordingly, for the described embodiment housings may be used interchangeably with display platforms. As described in further detail below, other embodiments may include display screens mounted to and supported by the first display platform 310 and a second display platform 320.

As illustrated in this embodiment, the dual display information handling system is in a portrait page orientation and the screens are oriented in a double tablet orientation with both the first display screen 311 and the second display screen 321 viewable. First display screen 311 and second display screen 321, or their display platforms 310 and 320, are connected via a hinge structure 330 along one side of each display screen. Hinge structure 330 may run most of the entire length of one side of each of the first display screen 311 or display platform 310 and second display screen 321 or display platform 320. Alternatively, one or more hinges may be connected only at portions of the edges of the two display screens 311 and 321 or their respective display platforms 310 and 320. For example, one hinge point connection may be sufficient at only one spot along the edge of the two display screens. In another embodiment, two connection points may be sufficient. In this example the two connection points may be near the ends of the hinged edges of the two display screens 311 and 321 in an example embodiment. The hinge connection 330 may include power and communication connections allowing information and power to be transferred between display screens 311 and 321 and their respective display platforms 310 and 320. This will provide flexibility on where to locate various processors, power sources, connections, and sensors as between the display platforms or housings of display screens 311 and 321. In another embodiment, one or more display screens 311 and 321 may not require any housing and most or all components may be stored in the hinge connection 330 or the housing of the other display screen.

In yet another embodiment, the hinge connection 330 may be disconnectable to permit display screens 311 and 321 to operate as display screens connected by a wireless connection or as altogether independent information handling systems such as tablets. Magnetic connectivity may maintain the hinge structure 330 when a disconnectable hinge is connected. Wireless data connection between detachable display screens 311 and 321 may be made via wireless communication standards such as near field communication (NFC) per standards ISO 18000-3, ISO 13157 and related standards or low power Bluetooth based connections (e.g. IEEE 802.15.1) maintained between the detachable display screens. Separate power sources, such as batteries, may need to be provided for each of the display screens; however coordination of power savings strategies may still be utilized to preserve battery power on one or both devices in accordance with the disclosures herein.

FIG. 3 also illustrates various sensor components in a dual display platform information handling system embodiment according to the disclosures. One or both display screens or their respective display platforms may contain one or more accelerometers 312, geomagnetic sensors 314, cameras 316, or digital gyroscopes 318. Additional state sensors may also be present including a photocell ambient light sensor, a Hall Effect magnet and sensor, camera, touch/hover sensors, and other sensors as described above.

There is no requirement that all sensor types be present. For example, a sensor module may only need a motion detector and a reference sensor as described above for one display screen and another similar sensor in the second display screen. For example, either an accelerometer 312 or a gyroscope 318 and a reference sensor such as a geomagnetic sensor 314 may be associated with one display platform 310 while the other display platform 320 has a sensor to detect changes or differences between the two display platforms 310 and 320. The second display platform may use a second geomagnetic sensor 314, or one motion sensor 312 or 318. There are even techniques known in the art of using a Hall Effect sensor or a Doppler shift sensor in the second display platform 320 to indicate changes in position as described above. The more sensor data available in each display platform 310 and 320 of the dual display platform information handling system, the better accuracy of the orientation data and less computing required to determine the positioning orientation. The down side however is added the expense, space, and power resources that many sensors will occupy in the dual display information handling system.

In one embodiment, two display platforms 310 and 320 are connected by a 360° hinge 330 along one side with data and power connections so that communications and power may be shared between each display platform side. In one particular embodiment, the 360° hinge 330 also allows any orientation between the two hinged display platforms at any relative angle in from 0° in a fully closed position so that the display screens of the current embodiment face one another to 360° so that the dual display platforms are fully open with display screens on either side.

Figure 4:
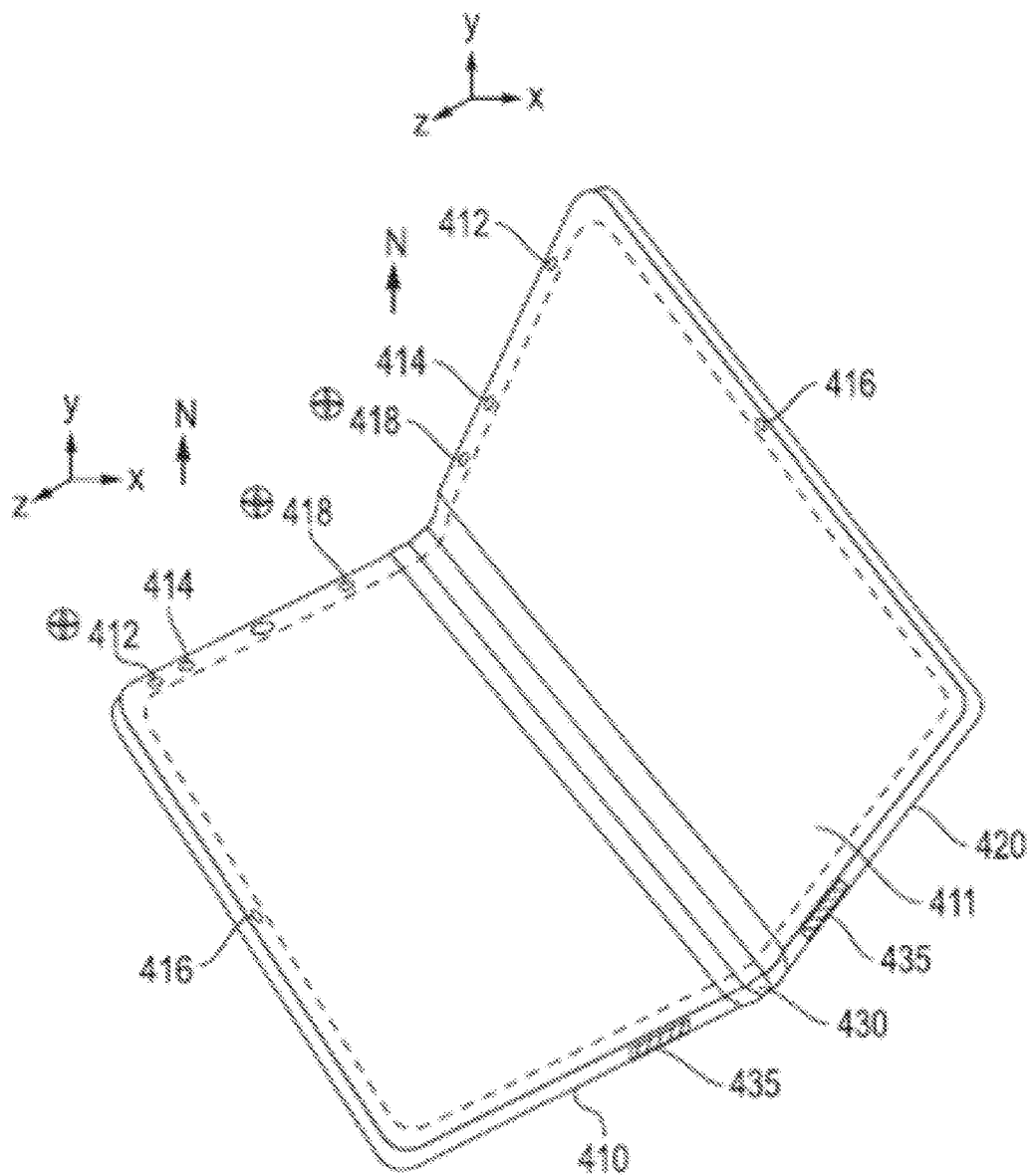
FIG. 4 illustrates another example dual display platform information handling system according to another embodiment of the present disclosure.

FIG. 4 shows another example embodiment of a dual display platform information handling system with two hinged display platforms according to an embodiment of the invention. In this example embodiment, the dual display platform information handling system 400 has a flexible display screen 411, such as a flexible active-matrix organic LED (AMOLED) display, that is mounted over or into first display platform 410 and a second display platform 420. In one embodiment, first display platform 410 and second display platform 420 may comprise housings to contain underlying electronics and power components of the dual display platform information handling system. Accordingly for the described embodiment, housings may be used interchangeably with display platforms. In the example embodiment, the display screen 411 may be mounted to and supported by the first display platform 410 and a second display platform 420. The mounted flexible display screen 411 may be movably mounted two display platforms 410 and 420. In other words, mounted flexible display screen 411 may be able to slide or otherwise move with respect to the first display platform 410 and/or second display platform 420.

An example embodiment for vents 435 for the passive cooling system is shown in FIG. 4. Additional vent locations are contemplated as well including at locations along other edges, on the back surface of the dual display platform information handling system, along the hinge 430, or along edges of the display screen 411. It is appreciated that locations of these passive cooling vents may be impacted by the orientation mode of the dual display platform device.

As illustrated in this embodiment, the dual display information handling system is in a landscape page orientation and the display platforms for 410 and 420 are oriented in a laptop orientations with both portions of display screen 411 viewable. A laptop orientation, the azimuth angle is at 0°. In other words the hinge is perpendicular to the viewer. The display platforms 410 and 420 are in a relative angle to one another of approximately 100°. A range is contemplated of however, in may be anywhere from approximately 90° to 120°. Laptop orientation is discussed further below with respect to FIG. 7. Display platforms 410 and 420, are connected via a hinge structure 430 along one side of each display screen. Similar to the embodiment described in FIG. 3, hinge structure 430 may run most of the entire length of one side of each of display platform 410 and display platform 420. Alternatively, one or more hinges may be connected only at portions of the edges of the two display platforms 410 and 420. For example, one hinge point connection may be sufficient at only one spot along the edge of the two display screens. In another embodiment, two connection points may be sufficient. In this example the two connection points may be near the ends of the hinged edges of the two display platforms 410 and 420. The hinge connection 430 may include power and communication connections allowing information and power to be transferred between display platforms 410 and 420. Additionally, thermal communication may occur between display platforms 410 and 420 via the hinge connection 430 by way of flexible heat pipe, high conduction surface, or other heat conductive means. This will provide flexibility on where to locate various processors, power sources, connections, and sensors as between the display platforms or housings 410 and 420. In another embodiment, display screens 420 may not require any housing and most or all components may be stored in the hinge connection 430 or the other display platform.

FIG. 4 also illustrates various sensor components in a dual display platform information handling system embodiment according to the disclosures. One or both display platforms 410 and 420 may contain one or more accelerometers 412, geomagnetic sensors 414, cameras 416, or digital gyroscopes 418. Additional state sensors may also be present including a photocell ambient light sensor, a Hall Effect magnet and sensor, camera, touch/hover sensors, and other sensors as described above. Similar to the above, there is no requirement that all sensor types be present. A variety of sensor combinations may be used as described above.

In one embodiment, two display platforms are connected by a 360° hinge 430 along one side with data and power connections so that communications and power may be shared between each display platform side. In one particular embodiment, the 360° hinge 430 also allows any orientation between the two hinged display platforms at any relative angle in from 0° in a fully closed position to 360° where the flexible display has portions on opposite outsides of the dual display platform information handling system and is fully open. In one alternative embodiment, the flexible display associated with the two display platforms may not fully close to 0°. The hinge range may be limited to between approximately 30° to 360°. The limit on the range of closure of the single flexible display embodiment is subject to the limitation of folding of the flexible display used. In this embodiment the dual display platform information handling system may be off when in a 360° orientation or the fully open position. Alternatively 360° orientation, or the fully open position, may be activated as a tablet orientation. Several of examples of display orientation modes are illustrated further in FIGS. 5-11.

FIGS. 5-11 illustrate a plurality of exemplary embodiments of display orientation modes for a dual display platform information handling system embodiments with two display platforms integrably hinged along one side. The embodiments of FIGS. 5-11 may include both dual display platform information handling systems with two display screens or dual display platform information handling systems with a single flexible display screen attached across two display platforms. The display orientation modes reflect the orientation of the dual display platform information handling system in three dimensional space and the relative positions of the display platforms to one another.

As explained further, these display orientation modes may impact passive cooling efficiency by affecting venting locations and a proximity of heat generating elements within the display platforms. Additionally the display orientation modes affect which display platform may be designated as a primary or secondary display platform or may implicate portions of the display that may be rendered primary or secondary. Determination of portions of the display as primary or secondary will impact the decision to locate application windows and reduce operational levels of certain portions of the display screen or screens.

Add to the display orientation modes, other factors such as the thermal profile, the software application operating state rankings, and the state of usage activity of the system. With these factors, the dynamic thermal management system described selects one or more thermal management strategies to assist the passive cooling system of the dual display platform information handling system. The display mode selector associated with the dual display platform thermal management application and the application window locator system determines a dynamic thermal mode to execute a strategy for the dual display platform device. In some cases, working software application context or state of usage activity may factor as well on determining the dynamic thermal management mode. In other cases, such data may have little impact on a dynamic thermal management mode.

Figure 5:
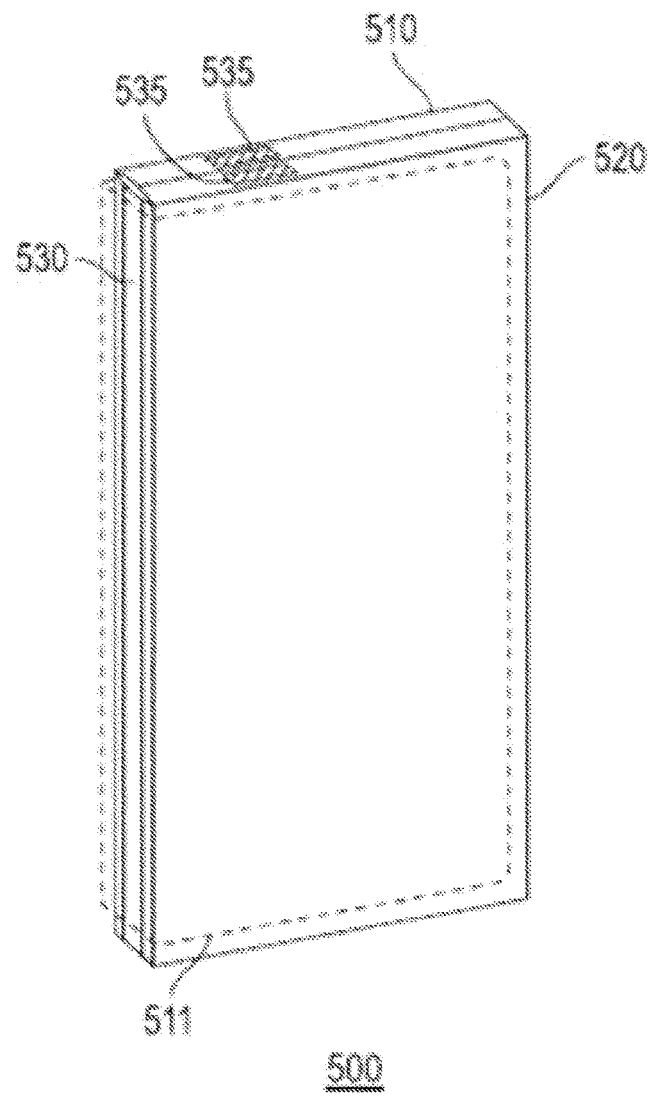
FIG. 5 illustrates an example dual display platform information handling system in tablet mode orientation according to an embodiment of the present disclosure.

FIG. 5 shows an example of a dual display platform information handling system with two hinged display platforms according to an embodiment of the invention. The dual display platform information handling system 500 has a first display platform 510 and a second display platform 520. Shown in this embodiment are vents 535 for the passive cooling system (not shown). As illustrated in this embodiment, the dual display platform information handling system is in tablet orientation with the flexible display screen 511 surface external to the dual display platforms 510 and 520. First display platform 510 and second display platform 520 are connected via a hinge structure 530 along one side of each platform. In the shown embodiment, hinge structure 530 may run most of the entire length of one side of each display screen, but other hinge embodiments are contemplated as discussed above. In tablet mode, the hinge may be between 340° to 360°. Flexible display screen 511 is shown to wrap around hinge 530 so that flexible display screen 511 is on the external side of each of display platforms 510 and 520, as well as external to hinge 530. In one embodiment this may be the off position for the dual display platform information handling system 500. In another embodiment, the flexible display screen 511 maybe activated in its entirety or one or more portions. In that embodiment, the dual display platform information handling system may operate in a tablet mode. In tablet mode, a portion of flexible display screen 511 associated with either display platform 510 or display platform 520 may be active for user interface. In other embodiments, portions of flexible display screen 511 may be viewed from either side on display platforms 510 and 520. An alternative embodiment is contemplated whereby the dual display platform information handling system includes dual display screens (not shown) associated with each of display platforms 510 and 520 operating in a tablet mode similar to that described above.

Figure 6A:
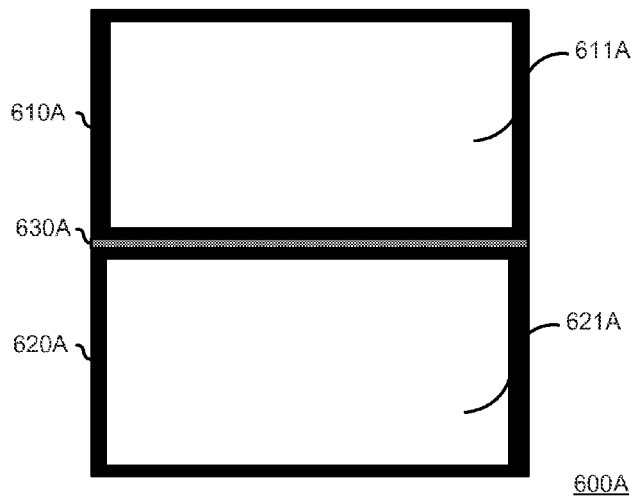
FIGS. 6A and 6B illustrate additional example dual display platform information handling systems in dual tablet mode orientations according to an embodiment of the present disclosure.

FIG. 6A illustrates a landscape page orientation for a dual display platform system in a double tablet orientation 600A of the present disclosure. In this orientation, a first display screen 610A and a second display screen 620A are connected via a hinge 630A having a hinge azimuth orientation at 0° or perpendicular to the sight line of a viewer. A tilt motion of the double tablet oriented device, for example by lifting the top edge relative to the bottom edge, may orient images on the two display screens to be viewable, in this case in a sight line from the bottom. Such a motion can activate accelerometers or another tilt detector to orient the viewable images. Alternatively, a camera sensor may be used to detect the location of a viewer or viewers to determine the orientation of the images on the display screens 610A and 620A for viewing. For example, the camera may detect a user at the bottom of the device and set the display with a sight line from the bottom. In these embodiments, the hinge 630A is designed so that the dual display information handling system may be arranged in an open position at approximately 180° where the front of both display screens are viewable. Display screens 610A and 620A may be combined virtually into a single viewable screen so images are viewable across both display screens for certain software applications. A range of dual tablet hinge angles are contemplated. Generally, if both display screens are viewable or combined as a single viewable screen, the system orientation may be considered double tablet mode. In one example embodiment, a double tablet orientation with landscape page orientation have a relative hinge angle of between approximately 160° and approximately 200°. In an alternative embodiment, a single flexible display screen (not shown) may span both display platforms 610A and 620A. Operation of this double tablet orientation with a single flexible display screen may be similar to that described above.

Figure 6B:
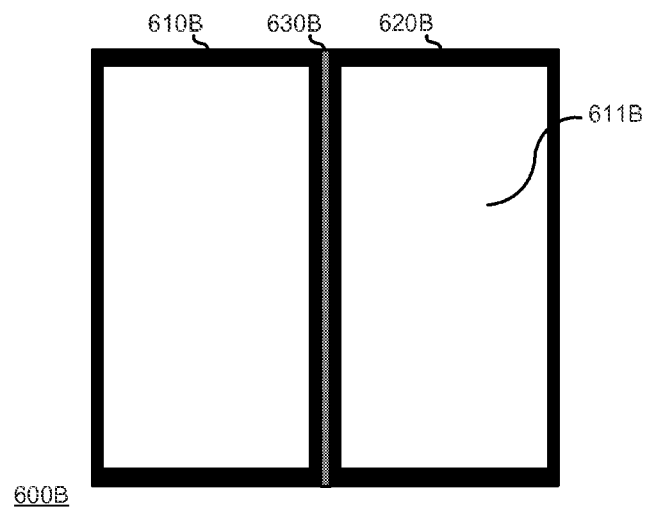

FIG. 6B illustrates a portrait page orientation for a dual display platform information handling system embodiment 600B in double tablet orientation. In this orientation, a first display platform 610B and a second display platform 620B are connected via a hinge 630B having a hinge azimuth orientation at 90° or parallel to the sight line of a viewer. A tilt motion of the double tablet oriented device, for example by lifting the top edge relative to the bottom edge, may orient images on the two display screens to be viewable, in this case in a sight line from the bottom. Alternatively, a camera sensor may be used to detect the location of a viewer or viewers to determine the orientation of the images on the display platforms 610B and 620B for viewing, for example in a sight line from the bottom. In these embodiments, the hinge 630B is designed so that the dual display information handling system may be arranged in an open position at approximately 180° where the front of a flexible display screen 611B is viewable. A range of dual tablet relative hinge angles between the two display screens is contemplated. Generally, if both display screens are viewable and combined as a single viewable screen, the system orientation may be considered double tablet mode. In one example embodiment, it is contemplated that a double tablet orientation with portrait page orientation have a relative hinge angle of between approximately 160° and approximately 200°. In an alternative embodiment, a two or more display screens (not shown) may be associated with display platforms 610A and 620A. Display platforms 610B and 620B may be combined virtually into a single viewable screen so images are viewable across both display screens for certain software applications. Operation of this mode with a two or more flexible display screens may be similar to that described above.

Figure 7:
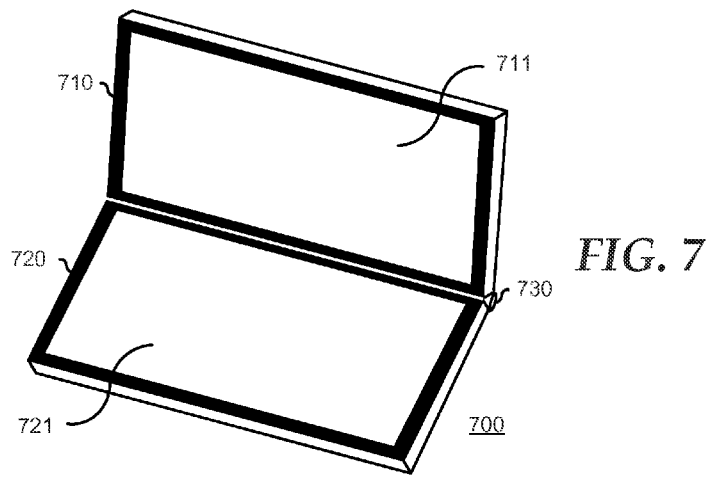
FIG. 7 illustrates an example dual display platform information handling system in laptop mode orientation according to an embodiment of the present disclosure.

FIG. 7 illustrates a laptop orientation 700 for the dual display information handling system embodiment of the present disclosure. In the embodiment of FIG. 7, a first display platform 710 and a second display platform 720 are connected via a hinge 730 having a hinge azimuth orientation at 90° or perpendicular to the sight line of a viewer. The hinge is designed so that the dual display information handling system may be arranged in an open position at approximately 100° relative angle between the two display screens and where the front of both display screens are viewable. In the current embodiment, first display platform 710 and second display platform 720 each have associated therewith a display screen 711 and 721 respectively. A range of relative hinge angles for a laptop orientation between the two display screens is contemplated, so long as the lower or base display platform 720 is usable for an application interface such as a virtual keyboard. In one example embodiment, it is contemplated that laptop orientation have a relative hinge angle of between approximately 90° and approximately 120°. Another embodiment involving laptop mode is illustrated above in FIG. 4 having a single flexible display screen.

Figure 8A:
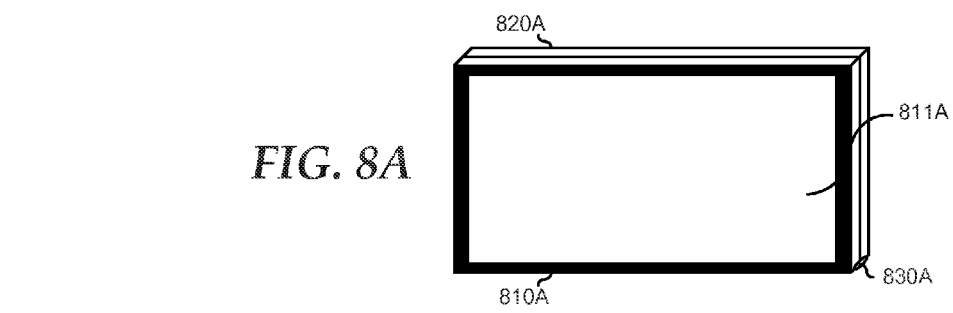
FIGS. 8A, 8B, and 8C illustrate other example dual display platform information handling systems in tablet mode orientations according to an embodiment of the present disclosure.
Figure 8B:
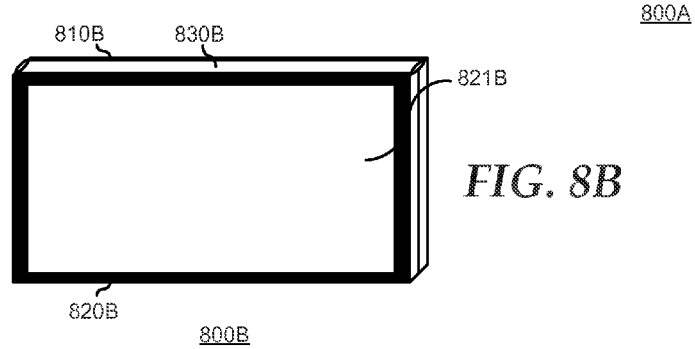
Figure 8C:
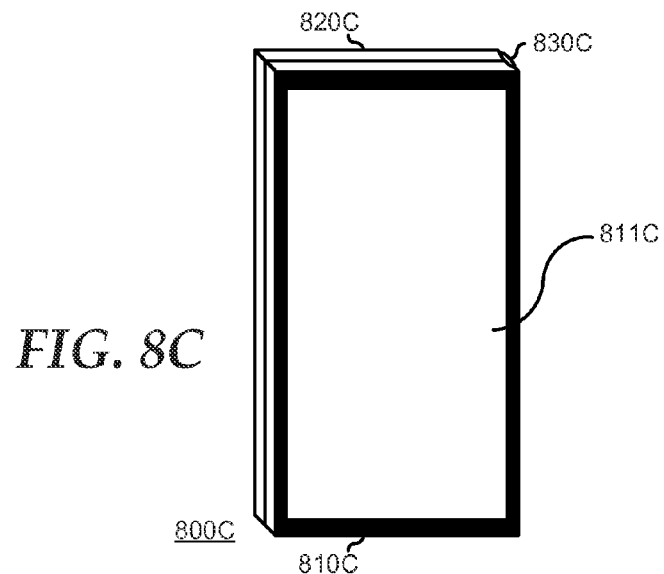

FIGS. 8A, 8B, and 8C illustrate tablet orientations 800A, 800B, and 800C for the dual display platform information handling system embodiment of the present disclosure. In the embodiments of FIGS. 8A, 8B, and 8C, a first display platform 810A and a second display platform 820A are connected via hinge 830A where the hinge 830A is fully open, or nearly fully open, so that the back sides of the two display platforms 810A and 820A are in contact or nearly in contact. The hinge angle may be anywhere from 340° to 360°. In orientation mode 800A, first display screen 811A is viewable and second display screen is folded behind. Orientation of the device is in landscape page orientation in the shown embodiment. FIG. 5 shows a tablet mode utilizing a flexible single screen similar to the embodiment of FIG. 8A.

In orientation mode 800B, the second display screen 821B is viewable in the front of the device in landscape page orientation and the first display screen is folded behind. First display platform 810B and a second display platform 820B are connected via hinge 830B where the hinge 830B is fully open, or nearly fully open. Similarly, an embodiment is contemplated whereby a second portion of a flexible display screen supported by second display platform 820B is viewable in an orientation mode 800B and a first portion is folded behind.

Orientation mode 800C is similar to orientation mode 800A except that the device is in a portrait page orientation with first display screen 811C visible. Orientation 800 C shows display platform 810C and display platform 820C connected via a hinge 830C. Not shown, a portrait page orientation mode with the second display screen viewable in the front of the device is also contemplated. A range of tablet orientation mode hinge angles is contemplated so long as one display screen, or one portion of a flexible display screen, is a primary viewed display screen or portion. In one example embodiment, it is contemplated that tablet mode orientation have a relative hinge angle between display platforms 810C and 820C of between approximately 340° and approximately 360°. FIG. 5 shows a tablet mode utilizing a flexible single screen similar to the embodiment of FIG. 8C.

Figure 9:
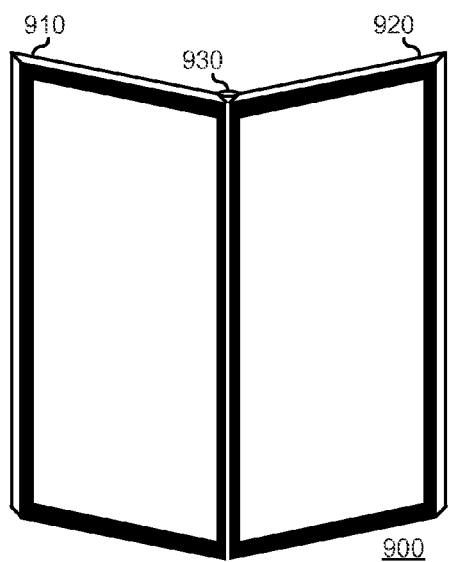
FIG. 9 illustrates an example dual display platform information handling system in book mode orientation according to an embodiment of the present disclosure.

FIG. 9 illustrates a book mode orientation 900 for the dual display information handling system embodiment of the present disclosure. In the embodiment of FIG. 9, a first display platform 910 and a second display platform 920 are connected via a hinge 930 having a hinge azimuth orientation at approximately 0° or parallel to the sight line of a viewer. The hinge is designed so that the dual display information handling system may be arranged in an open position at approximately 90° relative angle between the two display screens and where the front of both display screens are viewable. A range of dual book mode orientation hinge angles is contemplated with both display screens to be viewed with images in portrait page orientation. In one example embodiment, it is contemplated that book mode orientation have a relative hinge angle of between approximately 20° and approximately 180°. Note that this may overlap somewhat with one embodiment of portrait page orientation in double tablet orientation mode. In another embodiment, it is contemplated that a dual display platform information handling system with a single flexible display screen (not shown) may also be oriented in book mode similar to that described above.

Figure 10:
FIG. 10 illustrates an example dual display platform information handling system in media display mode orientation according to an embodiment of the present disclosure.

FIG. 10 illustrates a media display mode orientation 1000 for the dual display information handling system embodiment of the present disclosure. In the embodiment of FIG. 10, a first display platform 1010 and a second display screen 1020 are connected via a hinge 1030 having a hinge azimuth orientation at approximately 90° or a hinge line perpendicular to the sight line of a viewer. The hinge is designed so that the dual display information handling system may be arranged in an open position at approximately 305° relative angle between the two display screens or two portions of one display screen and where the front of one display screen or portion is viewable and the other display screen is face-down. However, a range of relative hinge angle between the two display screens is contemplated in media display mode orientation 1000 however. In one example embodiment, it is contemplated that media display mode orientation have a relative hinge angle of between approximately 250° and approximately 340°. Note that this may overlap somewhat with one embodiment of portrait page orientation tent orientation mode described below. However, in media display mode orientation 1000, one display screen is generally facing in a downward orientation and unlikely to be viewable. In one embodiment, first display platform 1010 and second display platform 1020 may be interchangeably designated based on determination of which display platform and display is viewable. It is contemplated that either display platform may be viewable in media display mode 1000.

Figure 11:
FIG. 11 illustrates an example dual display platform information handling system in tent display mode orientation according to an embodiment of the present disclosure.

FIG. 11 illustrates a tent mode orientation 1100 for the dual display platform information handling system embodiment of the present disclosure. In the embodiment of FIG. 11, a first display platform 1110 and a second display platform 1120 are connected via a hinge 1130 having a hinge azimuth orientation at approximately 90° or a hinge line perpendicular to the sight line of a viewer. The hinge is designed so that the dual display information handling system may be arranged in an open position at approximately 305° relative angle between the two display screens and where the front of one display screen is viewable on one side while the other display screen is viewable on the other side. In an example embodiment, a range of relative hinge angles between approximately 180° and 350° between the two display platforms is contemplated for tent mode orientation 1100. When both display screens are to be viewed with images in landscape page orientation from opposite sides, tent mode orientation may take effect. In one example embodiment, it is contemplated that tent mode orientation have a relative hinge angle of between approximately 200° and approximately 340°. Portrait page orientation mode viewing is also contemplated in some embodiments of tent mode orientation. Note that the relative hinge angle may overlap with other embodiments, such as one embodiment of media display mode orientation or even single or dual table mode.

Each orientation mode is not necessarily separate from other orientation modes in available ranges of relative angle or hinge azimuth orientation of the hinge. Moreover, all angles including hinge azimuth angles relative to a viewer's line of sight are approximate and may vary substantially. For example, in hinge azimuth angles a variance may be up to +/−30°. This is due, for example, to variation of a viewer's position while using the dual display information handling system including substantial range of view point, head position, and body position. Relative hinge angles may also vary by several degrees of orientation and may be set to any range of relative angles that meet the functional needs of the usage mode. The usage mode selected by the display dual display power management system may depend on the working software application context of the running software applications as well as input from sensors detecting states of usage activity of the dual display information handling system.

Figure 12:
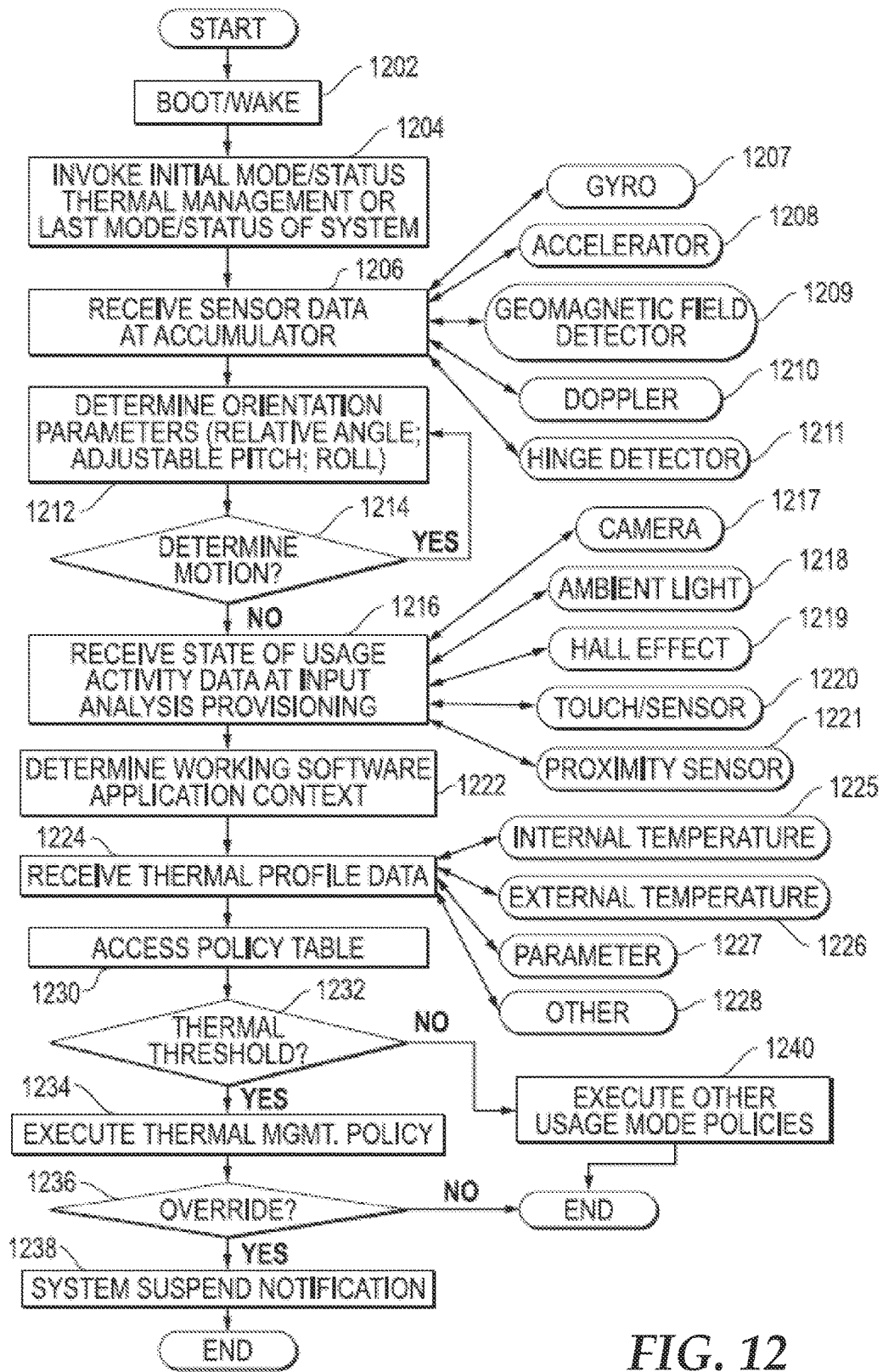
FIG. 12 is a flow diagram illustrating an example system for determining power savings for a dual display platform information handling system depending on orientation, working software application context, and thermal profile status.

FIG. 12 shows a flow diagram illustrating implementing a thermal management system for a dual display platform information handling system according to one embodiment of the disclosure. In this example embodiment, it can be seen that if the thermal management system is not triggered due to thermal profile factors, the dual display platform information handling system may then continue to utilize usage mode determinations for locating application windows and virtual tools according to orientation detected and operating state priority rankings as disclosed in related U.S. patent application Ser. No. 14/101,602 entitled "System and Method for Positioning an Application Window Based on Usage Context for Dual Screen Display Device." Similarly in other embodiments, the dual display platform information handling system may continue to utilize a power management system as disclosed in related application U.S. patent application Ser. No. 14/066,484, entitled "System and Method for Display Power Management for Dual Screen Display Platform" to preserve battery or reduce power draw. While some power saving strategies may correspond in part to certain dynamic thermal management strategies discussed herein, the criterion for action by the dynamic thermal management system may be different. Moreover, the power management strategies may yield more immediate results with respect to power consumption. The dynamic thermal management system may incorporate several thermal profile factors and extrapolate temperature trajectories to provide one or more actions to avoid reaching a critical temperature.

Although several embodiments herein discuss a thermal profile threshold, it is anticipated that plural thresholds may progressively trigger more involved dynamic thermal management states or strategies to manage heating and temperature of the dual display platform information handling system. This may be done to avoid reaching a critical temperature level that could require the dual display platform device to be suspended or shut down in accordance with prior art thermal safety measures. Numerous variations on the method of FIG. 12 are contemplated and the order of steps are not exclusive as shown in the embodiment of FIG. 12. It is understood that steps may be performed in any order or simultaneously.

Sensor data, state of usage activity data, and working software application context data are received and processed to determine the orientation, motion, usage and running software application environment of the dual display information handling system. Thermal measurement, power draw recordings, and other data may be gathered to create a thermal profile for one or both sides of the dual display platform information handling system. The application window locator system may designate primary or secondary display platforms for the orientation modes. Based on primary display platform determination, thermal profile, application operating state rank, orientation, power draw, and other factors, the thermal management application then selects a thermal management strategy policy. The thermal management strategies of that policy automatically engage if policy parameters are triggered upon reaching one or more threshold levels. For example, a first set of thermal management policy parameters may be triggered if a thermal profile reaches one threshold level. A second set may be triggered at another threshold level, and so on.

Thermal management policy parameters may depend upon orientation of the dual display platform information handling system. For example, orientation modes may prove to be more or less efficient in passive cooling. A tablet mode may have the plurality of display platforms in close contact with one another. Additional heat generation within such proximity may require a shift in thermal profile thresholds based on the orientation mode in this example embodiment. Other embodiment orientation modes may impact passive thermal venting. This will depend on the location and design of thermal venting for the dual display platform device. Laptop mode or media display mode may have one display platform in contact with a surface such as a table or desk. Tent mode and book mode may have an edge in contact with a surface or a display platform. Depending on location of the venting for the passive cooling system, thermal profile thresholds may be modified for the dynamic thermal management system.

In certain embodiments, an override status exists or an override command may be received that restricts thermal management strategy for prevents any thermal management strategy from being implemented. The dual display platform information handling system modified with the thermal management state that implements the thermal management strategy.

The process begins at 1202 where the dual display information handling system is booted up or wakes from a dormant sleep state. At this point no thermal management state or mode need be set.

In one embodiment a boot kernel will invoke an initial thermal platform management state or mode from provisioning that is default to the dual display information handling system upon boot up at 1204. If the default thermal management state is utilized, it may be the most recent thermal management state or may be an altogether default power management state, such as set in provisioning, upon receiving a wake command at 1204. In certain example embodiments, any default thermal management state will not be triggered at 1204 unless thermal profile reaches at least a first thermal threshold level.

Proceeding to 1206 of the present embodiment, an data acquisition sensor hub receives sensor data relating to orientation of the dual display platform information handling system. Multiple orientation sensors in the dual display platform information handling system, including duplicate types of sensors as described in more detail above, may send data to the sensor hub. The sensor hub collects this data at 1206. The sensor hub may perform a fusion and grooming of the raw sensor data into a useable form of positional data for the dual display information handling system and its display screens. In one embodiment, the sensor hub may communicate and receive data from the following sensors via a bus connection such as I2C: a digital gyroscope 1207, an accelerometer 1208, a geomagnetic field sensor 1209, a Doppler shift detector 1210, and/or an electro-mechanical hinge angle sensor 1211. One or more of these sensors may not communicate with the sensor hub, but may instead communicate directly with the processor chipset.

At 1212, a processor, such as the CPU or an embedded controller, determines what the orientation parameters are and matches those orientation parameters to one or more device orientation modes. For example, the processor running code instructions of a power management application may determine relative angle between two display screens and hinge azimuth orientation. The power management application also may determine 3-D spatial orientation of the dual display platform information handling system as a whole and the orientation of one or more of its display screens. FIGS. 3-11 show several example orientation modes for the dual display platform information handling system. Proceeding to 1214, the thermal management system determines if there is additional ongoing motion by the dual display platform information handling system. If so, the system proceeds back to 1212 to re-determine relative angle and hinge azimuth orientation parameters thereby establishing a new possible orientation mode of the device. Some motion, such as motion due to travel in a vehicle may alter sensor data continually. For example, geomagnetic field values may be altered. However such motion should not trigger recalculation, only motion of the dual display platform information handling system that constitutes a change in orientation mode. So a threshold of motion detection level must be reached to indicate an orientation mode configuration transformation at 1214.

If no configuration transformation motion is detected at 1214, the flow proceeds to 1216 where usage activity state data is received. State usage activity sensors may include a camera 1217, an ambient light sensor 1218, a Hall Effect sensor system 1219, a touch or hover sensor 1220, and a proximity sensor 1221. Each usage activity state sensor may be operated by independent drivers. Some, such as the touch/hover system may even have its own controller. As stated above, these usage activity state sensors may also be connected via the sensor hub microcontroller or may connect directly to the dual display power management system operating on processors in the core chipset(s).

Proceeding to 1222, the thermal management system for the dual display platform information handling system determines the working software application context. The system determines which software application context category the working software application(s) fall into. To make this determination the thermal management system may utilize the state of usage activity from 1216, and may access operating state rank for active applications.

Operating state rank for active applications may be preset based upon the nature of the application running. For example teleconference application with an ongoing video teleconference communication would receive a high operating state rank. The operating state rank would be determined in part by the nature of the running application as well as sensor data indicating that the camera is active or data indicating that a telecommunication channel is live streaming.

Other examples include factors such as ongoing touch of an application window from a user. The application programming interface (API) as described in FIG. 2 may operate to detect ongoing usage or interface via touch or other mechanism with an application window. The API will have data to determine varying levels of ongoing activity and interaction with the plurality of applications that may be running at a given time. An indication of ongoing usage or interaction would elevate the operating state rank priority of an open application window. The working software application context includes an operational state ranking of each of the running software applications. The priority ranking of the running software applications in one embodiment is based upon the application that is most likely to be actively used.

In another embodiment priority ranking of application operating states is impacted by applications where interruption or quality of service is less tolerable by users. In other words, an application where consistency of experience in high quality of service are required, such as video streaming or video teleconferencing, will receive a higher operating state rank when active.

The operating state ranking may also reflect the amount power consumed to perform tasks in a ranked application. For example applications with tasks of low complexity such as audio playback having no network conductivity may require less power. Thus, the benefits of a lower operating state rank may not be realized in a thermal management strategy if a low complexity application is disabled or operationally reduced by virtue of a lower operational state priority rank. If no noticeable thermal effect will result from suspending a low complexity application, reducing processor time allocated to such an application may not be worthwhile.

Higher complexity applications such as video editing, video streaming applications, high graphic utilization, network connected downloading, or similar applications may involve high complexity tasks. The high complexity tasks may even utilize more than one complex processor core. Thus, power draw for these applications may be high. If such applications are not actively being used or have high tolerance of interruption/reduced QoS, these applications may be given lower priority ranking as a result. Higher complexity applications will yield greater thermal impact when limited during execution of thermal management strategies. For instance, a variety of background services operated on an information handling system for certain applications left open may consume power unnecessarily.

Additional factors may also be considered such as the quality of wireless connections. High quality wireless connections may permit offloading buffering or other tasks with relative high complexity due to favorable connectivity requirements. Moving such activity to a cloud environment when a wireless connectivity is quite good may save power. In such a case, offloading these tasks may consume lower power than utilization of local resources when thermal management strategies are required. By contrast, poor connectivity may consume substantial power in transmissions.

Examples of operating state ranking in view of usage mode characteristics in a policy table used by an application locator system of the dual display power management system are shown below in Table 1.

TABLE 1

Usage Mode Characteristics and Application Operating State Rank

| TYPE | RANK (1-5; 5 = HIGHEST) | CONTEXT OPERATING STATE | EXAMPLE LOCATION |
|---|---|---|---|
| Laptop; Media display mode; tablet mode | 5 | Video conference active. | Top display has software application window (e.g.; primary display, should have integrated camera) |
| Dual tablet mode; Book Mode; Tent mode | 5 | Video conference active. | One display (e.g., primary display) displays software application window. |
| Laptop; Dual tablet mode (landscape page) | 4 | Software application requests data input via virtual tool: for example; Office applications; email; websurfing; gaming. | Top display displays software application window; Base display displays virtual keyboard, other applications take lower priority. |
| Dual tablet mode (portrait page); Book Mode | 4 | Software application requests data input via virtual tool: for example, Office applications; email; websurfing; gaming. | One display (e.g., a primary display) displays software application window and virtual keyboard beneath; Second display screen may have lower priority applications. |
| Dual tablet mode (portrait or landscape page); Book Mode | 3 | Software application display window is actively being interacted with via touch or stylus or actively viewed (gaze) by user. For example, reading, note taking, websurfing. | Software application display window remains in current location with high priority. |
| Laptop | 3 | Software application display window is actively being interacted with or actively viewed (gaze) by user. For example, Office applications, email, websurfing, gaming. | Software application display window remains in current location with high priority. |
| Tent mode; Media display mode; tablet mode. | 3 | Media consumption such as video; music; websurfing; presentations; other applications. | Display software application window on screen facing user. |
| Laptop | 2 | Software application display window is not subject of active interaction by user. | If higher priority application is active, base display displays software application subject to virtual keyboard if available. Alternatively, software application window is hidden or minimized. |
| Dual tablet mode (portrait or landscape page); Book Mode | 2 | Software application display window is not subject of active interaction by user. | If higher priority application is active, second (e.g., non-primary) display displays software application subject to virtual keyboard if available. Alternatively, the software application window is hidden or minimized. |
| Dual tablet mode (portrait page); Book Mode; Laptop mode; Tent mode; Media display mode; tablet mode. | 2 | Video conference application not active. | If higher priority application is active, second (e.g., non-primary) display displays software application subject to virtual keyboard if available. Alternatively, the software application window is hidden or minimized. |

TABLE 1-continued

Usage Mode Characteristics and Application Operating State Rank

| TYPE | RANK (1-5; 5 = HIGHEST) | CONTEXT OPERATING STATE | EXAMPLE LOCATION |
|---|---|---|---|
| Dual tablet mode (portrait page); Book Mode; Laptop mode; Tent mode; Media display mode; tablet mode. | 1 | Data downloading; music streaming. | Lowest priority displays software application window in second or bottom display screen if available; otherwise hidden or minimized. |

Table 1 is but one example embodiment of a policy table for use with an application locator system as described in several embodiments herein. The ranking scale may involve any number of levels and may include more or less rank levels than four. The number of working software contexts and operating states may also be more granular and involve more policy table entries. The policy table entries may be more specifically tailor location outcomes to usage mode types or working software contexts. Additionally, the policy table may be customizable to reflect preferences of a user for placement and priority rank of software applications under various operating states. For example, a user may not want to be interrupted when a video conference call comes in above other software application activity and set up a customized "do not disturb" setting lowering the rank of video conference call applications.

The flow proceeds to 1224 where the thermal profile data is received. Thermal profile data may be collected from a variety of sources. This data is used to gauge whether the dual display platform information handling system is running at temperatures that may create a dangerous situation for user touching the system or may create a risk of operational breakdown of components of the system. Thermal profile data may be collected for each dual display platform, or may be collected for the system as a whole. In a dual display platform information handling system, elements such as processors (CPUs or GPUs), power supply units, or other systems may be located in either display platform. Sensors utilized to create a thermal profile may include temperature sensors as discussed further above. For example, one or more internal temperature sensors 1225, when one or more external temperature sensors 1226, or power draw wattage measurements 1227 may be used to create a thermal profile. Power draw measurements 1227 may be specific to the zones of the information handling system or specific to components such as the CPU or GPU.

Each thermal profile sensor may be operated by independent drivers or may also be connected via the sensor hub microcontroller as described above for orientation and other sensors. In another embodiment, internal and external temperature sensors, 1225 and 1226 respectively, may report directly to a thermal management controller or thermal management application as described above. Power draw measurements 1227 may be reported via the power supply unit control systems to the thermal management application. Other thermal profile sensors 1228 are contemplated as well. For example, they may be collected relating to clocking speeds of processors such as the CPU and GPU. This data may be used to anticipate power needs and therefore he generation of processors within the system. In another example, thermal profile sensors 1228 may include detectors for wireless connectivity quality of service levels. Such wireless connectivity ratings may indicate anticipated power consumed for wireless data exchange.

As is understood, in certain embodiments the determination of the orientation mode, the operating state rank of running applications, and the thermal profile of the system may be monitored in an ongoing manner. Upon determining the orientation mode, operating state rank of the running applications, and thermal profile data, the flow proceeds to 1230 to access a policy table to determine a usage mode selection from orientation criteria as described in detail in co-pending application numbers incorporated elsewhere herein by reference, as well as to determine appropriate thermal management strategy in the event a thermal profile threshold is met.

An example of thermal management policy that may be used by the dynamic thermal management system in connection with usage/orientation mode data for the dual display is shown below in Table 2.

TABLE 2

Thermal Management Policy

| TYPE | APPROXIMATE ORIENTATION | EXAMPLE THERMAL POLICY | WORKING CONTEXT |
|---|---|---|---|
| Laptop | Relative hinge angle 85° to 135°; Hinge azimuth at 0° and lying flat on surface. | Top display designated as primary; move lower priority applications to secondary display portion; reduce operational aspects (dim, refresh rate, etc.) of secondary display; suspend lower ranked applications. | Office applications: email; websurfing; video; other applications where a top display portion is primarily viewed. |

TABLE 2-continued

Thermal Management Policy

| TYPE | APPROXIMATE ORIENTATION | EXAMPLE THERMAL POLICY | WORKING CONTEXT |
|---|---|---|---|
| Book mode | Relative hinge angle 0° to 160°; Hinge azimuth at approximately 90° or relative to viewer. | Either display may be primary. Move lower priority applications to secondary display portion; reduce operational aspects dim, refresh rate, etc.) of secondary display; suspend lower ranked applications. | Reading; note taking; websurfing; nominal tasks. |
| Dual tablet mode | Relative hinge angle 160° to 200°. | Either display may be primary. Move lower priority applications to secondary display portion; reduce operational aspects (dim, refresh rate, etc.) of secondary display; suspend lower ranked applications. | Reading; note taking; Office applications; websurfing; gaming; web apps; music; other applications. |
| Tent mode | Relative hinge angle 200° to 340°; Hinge azimuth at approximately 90°. | Either display may be primary - if one user front display is primary. Move lower priority applications to secondary display portion; reduce operational aspects (dim, refresh rate, etc.) of secondary display; suspend lower ranked applications. | Media consumption such as video; music; websurfing; presentations; sharing mode. |
| Media display mode | Relative hinge angle 200° to 340°; Hinge azimuth at approximately 90°. | Top display facing user may be primary. Suspend lower ranked applications; shut down secondary display. | Media consumption such as video; music; websurfing; presentations; sharing mode. |
| Tablet mode | Relative hinge angle 340° to 360°. | Display facing user may be primary. Move lower priority applications to secondary display portion; reduce operational aspects (dim, refresh rate, etc.) of secondary display; suspend lower ranked applications; shut down secondary display. | Reading; notetaking; Office applications; video; music; websurfing; web apps; presentations; other applications. |

At decision diamond 1232, the thermal management system determines whether one or more aspects of the thermal profile have reached a thermal threshold level. Thermal threshold levels generally include a maximum temperature level above which it is determined that the dual display platform information handling system should not operate. For example, an external temperature detected of 50° C. would be too hot and potentially harmful to a user of the system. Thus, the thermal threshold level may be set at anywhere from 40 to 55° C. external temperature in one example embodiment. Additionally ambient temperature for the dual display platform information handling system may impact the external temperature measurements. Similarly, an internal temperature threshold may be set such that the external temperature would never reach this level. The internal temperature threshold may be set at the same or different temperature threshold than the external temperature measurements level. Factors such as external ambient temperature or insulation between the internal and external parts of the information handling system may determine threshold settings. It is understood that any desired temperature range may be used as a thermal threshold.

The thermal profile threshold level may also be impacted by data relating to power draw levels, processor clocking, wireless connectivity quality or other factors as discussed above. These will impact the thermal profile. For example, if the temperature levels are approaching an internal or external temperature limit but are still several degrees below the critical threshold, then an indication of power draw, processor activity, wireless connectivity or other factors may indicate how quickly the threshold will be met. This may influence the thermal profile to a lower the critical threshold internally or externally. At a lower threshold, thermal management strategies may be implemented in advance of reaching a certain internal or external temperature levels. The expected thermal trajectory may be anticipated in this way.

By the same token, conditions may indicate that temperature levels will not likely rise quickly to the critical level or that passive cooling may be able to accommodate the additional heat generation. Thus, dynamic thermal management strategies may be postponed until a critical threshold level is met or nearly met. The factors of the thermal profile may be used to tune the dynamic thermal management system.

If the thermal profile threshold has not been met, the flow proceeds to 1240 where the system may execute other usage mode policies as with normal operation. Example usage mode policies may be found in co-pending related applications which are incorporated by reference herein in their entirety.

If the thermal profile threshold has been met at 1232, then the flow proceeds to 1234. At 1234 the dynamic thermal management system executes a thermal management policy in accordance with the orientation/usage mode of the information handling system and according to the policy table referenced at 1230. An example policy table as disclosed above. As recited above, the orientation mode may impact the effectiveness of passive thermal systems in the information handling system. The orientation mode will moreover impact the dynamic thermal management strategies or states utilized as between primary and secondary display portions of the dual display platform information handling system.

Proceeding to decision diamond 1236, the dual display power management system determines whether an override command has been received or an override status has been set or changed to disable the dynamic thermal management system activity. A general override command may be received to disable the dynamic thermal management system of the dual display information handling system. Alternatively, override commands or settings may be specific to certain thermal management actions such as each of those in the above thermal management policy table. Or an override command may be received at 1236 that specifically operates to avoid disabling one or more application programs.

If there is no override the flow ends with the execution of the thermal management policy. If an override is received at 1236, in one embodiment the flow proceeds to 1238. At 1238, the override takes effect to halt execution of thermal management strategy. If thermal levels continue to rise, the system may optionally indicate that operation of the processors could be suspended. It is understood that rising above critical temperature levels beyond this level may cause system safety mechanisms to kick in and shut down the device.

The dynamic thermal management system will execute commands for a power saving strategy, processor reduction, as well as display limitation to reduce heat generation in accordance with the determined usage mode. The dynamic thermal management system may work in connection with a dual display power management system such as that disclosed application Ser. No. 14/101,612. The dynamic thermal management strategy involving power saving strategies may be executed in an embedded controller in the processor chipset(s) which can manage a battery management unit (BMU) as part of a power management unit (PMU) in the BIOS/firmware operating on the main CPU processors as part of the power operating system. Additionally, the PMU (and BMU) control power provision to the display screens and other components of the dual display information handling system. As described with respect to FIG. 2, the above method operates in connection with the dynamic thermal management system, application window locator system, usage mode determination from the display mode selector and the power management system.

The application window locator system will execute commands for locating software application display windows and virtual tools in accordance with the dynamic thermal management system as well as the software application operating state ranking and determined usage mode. Further description may be found in related applications. The application window locator system is executed in an embedded controller in the processor chipset(s) which manages commands to a display manager or windows manager in the BIOS/firmware operating on the main CPU processors as part of the operating system or on the GPU as part of the display system. A display manager controls commands for displaying, locating and maintaining software application display windows or virtual tools to be rendered on the dual display screens via the display platform driver(s). As described, power management may determine, via the BSU and power management controller to reduce operationally some or all of the display screen or display screens. The determination of the priority ranking and locations of the application display windows may be conducted by the context selection module in connection with the API which maintains data on current activity of operation software applications.

In an example embodiment, the dual display power management system may determine to power down a display screen or send it into a sleep mode depending on the usage mode determined by the display mode selector. In an alternative embodiment, the dual display power management system may elect to reduce power to one or both screens, or to portions of the display screen, depending on usage mode. Power reduction may be achieved by dimming the backlighting of the screen or may be achieved by reducing the refresh rate set by the display driver for the reduced display screen. Other power reduction effects may also be deployed to have an immediate effect on heat generation. For example, the API may restrict lower priority operating state ranked applications.

Dynamic thermal management strategy may also work in accordance with the application window locator systems to select lower priority applications and move them to secondary screen or secondary portion of the display screen. The dynamic thermal management system may then elect to suspend lower priority operating state rank applications. This may be done in addition to power reduction efforts with respect to the secondary screen or secondary portion of the display screen.

Dynamic thermal management strategy may also work to throttle back clocking levels of processors within the chipset including the CPU and GPU as is understood by those of skill in the art. Slowing clocking levels may reduce processor speed, however this will also reduce heat generation and power draw by the processors.

In one example embodiment the above dynamic thermal management strategies would be considered increasingly more invasive to device operation. Thus, in an example embodiment, a first level strategy may select low priority operating state rank applications and move those application windows to a secondary screen or secondary screen portion. Then the secondary display or secondary portion of the display may be operationally limited. This may include dimming the secondary screen or secondary portion of the display screen or may include reducing the refresh rate of the secondary screen to reduce GPU work. At a next level, the dynamic thermal management system may elect to suspend applications based on lowest operating state rank priority levels. Electing to suspend lowest priority applications may reduce load on processors and graphic systems. At yet another threshold level, the dynamic thermal management system may reduce power density granularity to active applications that are too highly ranked to be suspended. This may include reducing CPU or GPU clocking dedicated to performing tasks for higher-priority active applications. Such a measure may be drastic in that it could potentially impact or interrupt usage of these higher priority active applications. This may be preferable however to suspending or shutting down the information handling system entirely if temperatures reach a critical operational level.

Figure 13:
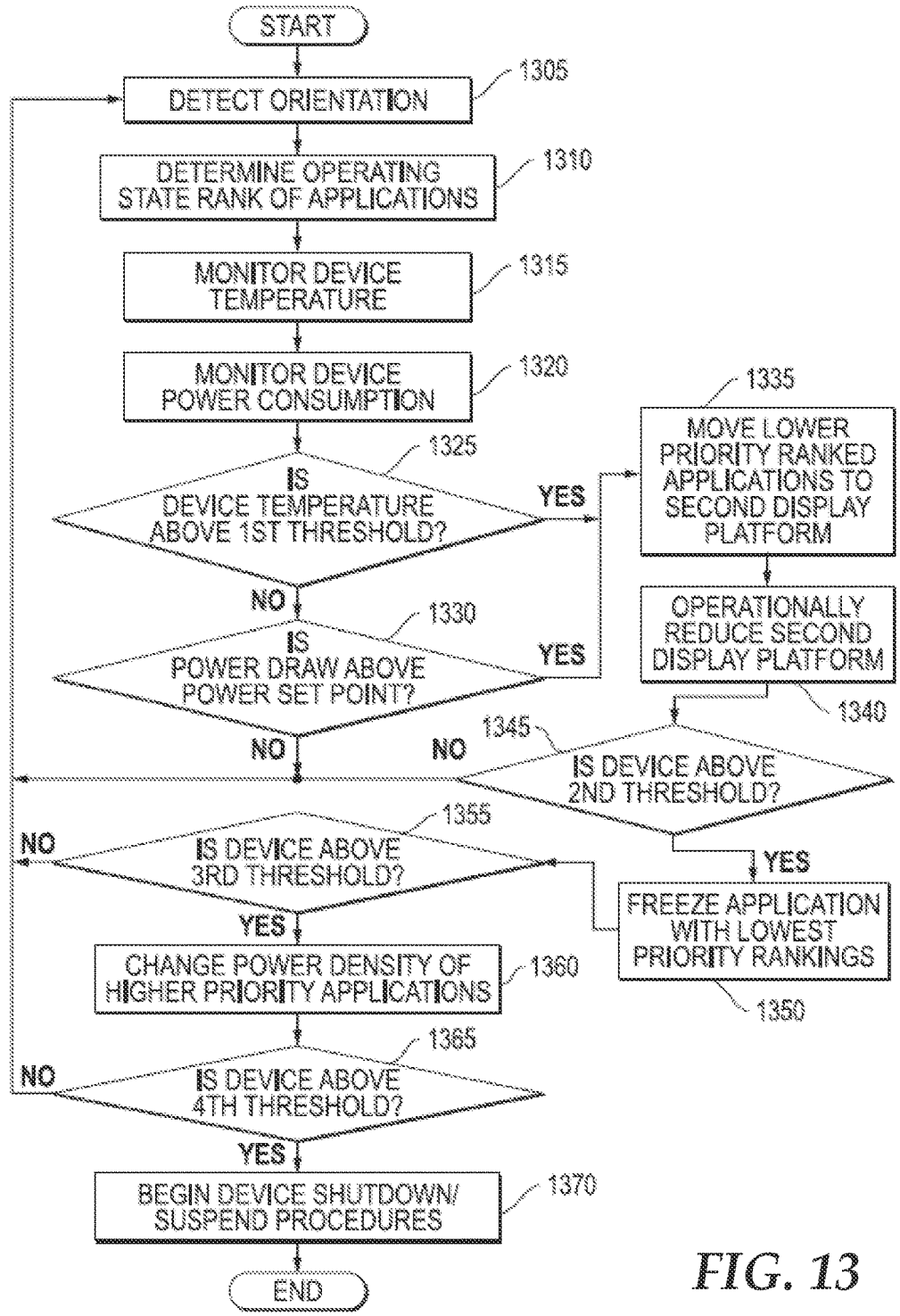
FIG. 13 is a flow diagram illustrating another example system for determining dynamic thermal management for a dual display platform information handling system depending on orientation of displays, working software application context, and thermal profile status.

FIG. 13 shows another flow diagram illustrating implementing a thermal management system for a dual display platform information handling system according to one embodiment of the disclosure. In this example embodiment, it can be seen that a plurality of thermal profile thresholds may be utilized to trigger stages of a dynamic thermal management strategy. The dynamic thermal management system may select from a series of dynamic thermal management strategies associated with the detected usage mode based on orientation. Numerous variations on the method of FIG. 13 are contemplated and the order of steps are not exclusive as shown in the embodiment of FIG. 13. Steps may be performed in an order or simultaneously as one of ordinary skill in the art would understand.

The process begins at 1305 where the orientation of the dual display platform information handling system is detected. As described above, the sensors detect relative angle of the display platforms, the azimuthal angle, and the orientation of the primary and secondary display platforms relative to the user. The usage mode, also referred to as the orientation mode, is determined according to one or more of the embodiments described above herein. The array of sensors may be used as described although only two sensors are necessary in certain embodiments as described herein and in the related applications. Example usage modes are listed in the first column of Table 2. Approximate orientations are described in the second column. Other usage modes are contemplated as well including a closed mode where the two display screens are closed upon one another. Note, in another embodiment the single, flexible display screen may be in a "closed" mode that is similar to tablet mode but powered down. In other words, the flexible display screen may be outside the dual display platforms when the system is closed or off. Activating tablet mode may require powering the system in another manner.

At 1310, the context selection module, in connection with data from several sources and including elements such as the API, touch controllers, and sensors, determines a operating state rank for running software applications. Referring back to the examples herein including those described in Table 1, the dynamic thermal management system accesses a priority ranking of applications. The operating state rank priorities may be altered as described in the various embodiments herein or incorporated by reference and may be modified in real time as the needs of the user change during operation of the dynamic thermal management system.

At 1315, the dynamic thermal management system monitors temperature internal, external, or both for the dual display platform information handling system. The sensors and measurements are taken similar to as described above. At 1320, the dynamic thermal management system also receives measurement of device power consumption. As described before, one or more measurements may be assessed. This may include an overall power consumption measurement. In another embodiment, power consumption may be measured to each of the one or more display platforms. In yet another embodiment, power consumption may be measured to operational elements that are rated to consume substantial power, for example, processors (CPU, GPU, controllers, or other), the display device or devices, backlighting (if any), projection systems or the like. Processor operating levels (clocking, etc.), wireless channel QoS levels, and other factors may also be assessed for a thermal profile threshold determination.

At decision diamond 1325 the dynamic thermal management system will access thermal threshold levels as set for internal or external sensors. In the present disclosure, the system determines a first threshold level at which initial power saving strategy may be implemented. The dynamic thermal management system will assess temperature and its proximity and trajectory toward or away from the first threshold level. In at least one embodiment, the internal or external temperature measurements are continuously monitored. In another embodiment, the internal or external temperature measurement may be periodically measured. It is contemplated that a plurality of temperature monitoring algorithms may be used with one or more thermal sensors in accordance with how monitoring device temperature would be conducted by those of ordinary skill.

If the first thermal threshold is not met, the flow may proceed to 1330. At decision diamond 1330, the dynamic thermal management system may access power consumption levels at one or more locations of the dual display platform information handling system. The dynamic thermal management system determines whether the power consumption level for any one of the monitored locations has reached one or more power consumption thresholds. The power consumption threshold levels may indicate excess levels of heat generation within the dual display device information handling system. The dynamic thermal management system will factor in expected heat generation by virtue of the expected power consumption levels at measured locations or for the device generally. For example, the dynamic thermal management system may alter the first thermal threshold based on the proximity of current temperature to the first temperature threshold, its trajectory toward or away from the first temperature threshold, and the expected heat generation from power consumption on accelerating heating within the device. It is understood that the dynamic thermal management system may combine aspects 1325 and 1330 in any order or simultaneously to generate a thermal profile threshold for triggering an initial dynamic thermal management strategy. The thermal profile threshold may include factors of the approach and proximity to the temperature thresholds and power consumption thresholds.

As described above, additional factors may be considered by the dynamic thermal management system in other embodiments of a thermal profile threshold. This may include sensing data indicating overclocking or elevated processing levels of one or more processors including the CPU or GPU. As is understood, higher levels of processing by one or more elements will be indirectly linked to use of power and heat generation and may factor into prediction of trajectories for the device temperatures and efficacy of the passive cooling elements within the device. In another example embodiment, wireless channel QoS levels may impact transmission processing load and, therefore indirectly effect heat generation.

If no thermal profile threshold, no power consumption threshold, or no other factor indicates reaching a thermal profile threshold at 1325 or 1330, the flow returns to 1305. Upon returning to 1305, the orientation mode, operating state rank, device temperature, device power consumption and other factors are monitored.

If a thermal profile threshold has been reached at 1325 or 1330, then a first dynamic thermal management strategy is executed. At 1335, lower priority operating state ranked applications are moved to a secondary display platform.

Proceeding to 1340, the display or portion thereof associated with the secondary display platform is operationally limited such that power consumption and heat generation are reduced. This assists the passive cooling system to keep the device below the thermal profile thresholds. Operational reduction of the display or portion thereof associated with the secondary display platform may include reduction or refresh rate, dimming backlighting, or other reduction strategies to reduce power consumption by the display screen or graphics processing for the lower priority operating state applications moved there.

Flow then proceeds to decision diamond 1345. At 1345, the dynamic thermal management system detects whether a second thermal profile threshold has been reached. If not the system returns to 1305 to detect orientation, assess operating state rank, and monitor device temperature, power consumption, and other features. If a second thermal profile threshold has been met at 1345, flow proceeds to 1350. To reduce GPU or CPU processing, applications with lowest operating state ranking priority are then frozen or suspended in a second dynamic thermal management strategy. In one embodiment, this may happen in reverse order of operating state rank. In another embodiment, all applications below a certain operating state rank priority may be suspended simultaneously. Similarly it is understood different embodiments may include suspending lower ranked applications in a variety of groupings.

Proceeding to decision diamond 1355, the dynamic thermal management system continues to monitor a thermal profile threshold. At 1355, the dynamic thermal management system determines whether a third thermal profile threshold has been reached. If not, then the flow returns to 1305 to again monitor orientation, operating state rankings, device temperature, device power consumption, processing levels, and other factors.

If a third thermal profile threshold has been met at 1355, then the system proceeds to 1360. At 1360 a third dynamic thermal management strategy is executed. In this embodiment, the dynamic thermal management system changes the power density for all applications including higher priority operating state ranked applications. This can include reducing CPU processing and GPU processing attributed to high-ranking applications. Again, reduction of processing for applications may be reduced in reverse order of priority or, in other embodiments, all applications above the specified operating state rank may be reduced simultaneously. The API may control operation of individual applications. In another embodiment, control of CPU or GPU processing speed may be controlled via the BIOS and other systems. In a further example, the primary display or portion thereof may be operationally reduced or limited. The operational limitation may include dimming light generation, reducing refresh rates, or other strategies as described above with the secondary display platform screen or screen portion. Dynamic thermal management strategies that might interfere with a user experience are reserved for higher thermal profile threshold levels.

Proceeding to decision diamond 1365, the system determines whether a fourth thermal profile threshold has been reached. If not, again the system returns to 1305 to detect orientation, operating state rank, device temperature, device power consumption, processing levels, and other factors as described above. If however a fourth thermal profile threshold has been reached at 1365, the flow proceeds to 1370. At 1370 the dynamic thermal management system engages with system BIOS begin to suspend or shutdown the device in accordance with procedures known in the prior art when an information handling system begins to overheat.

It is understood that as the thermal profile factors are monitored and thermal profile levels lower, the computer implemented method of FIG. 13 may work in reverse. For example, if measured internal or external temperature successfully drops below any of the threshold levels described above, it is understood that the stage of dynamic thermal management strategy being executed may be relaxed or cancelled. Similarly for all embodiments, reversal of the dynamic thermal management system strategies may be systematically undone. In certain embodiments, the dynamic thermal management system may take into account of thermal profile trends in selecting thresholds at which to reverse execution of dynamic thermal management strategy. The reversing may occur in a way that is asymmetric from In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium of main memory 109 and static memory or drive unit 110 that includes instructions or receives and executes instructions responsive to a propagated signal; so that a device connected to a network interface device 40 can communicate voice, video or data over the network 50. Further, the instructions may be transmitted or received over the network 50 via the network interface device 40.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium.

Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a primary integrated display platform and a secondary integrated display platform attached via a hinge;
   a passive cooling system;
   a processor executing instructions for a dynamic thermal management system to determine a thermal profile of the information handling system;
   an application window locator system for determining a location of a software application display window of a first software application running on the information handling system on the primary integrated display platform or the secondary integrated display platform;
   the dynamic thermal management system to operationally limit a portion of a display device proximate to the secondary integrated display platform;
   wherein the determination of which integrated display platform to locate the software application display window is based on a first relative orientation of the primary integrated display platform to the secondary integrated display platform, an operating state rank of the software application, and whether the thermal profile of the information handling system reaches a thermal threshold.

2. The system of claim 1, wherein a designation of the primary integrated display platform and the secondary integrated display platform is switchable as to which integrated display platform is designated as primary.

3. The system of claim 1, wherein the application window locator system locates a software application having a lower priority operating state rank on a display device proximate to the secondary integrated display platform upon the thermal profile reaching the thermal threshold.

4. The system of claim 3, wherein the dynamic thermal management system further determines to suspend the software application having the lower priority operating state rank if the thermal profile reaches a second thermal threshold level.

5. The system of claim 1, further comprising:
   a flexible display including a first portion proximate to the primary integrated display platform and a second portion proximate to the secondary integrated display platform.

6. The system of claim 1, wherein operationally limiting a portion of the display device proximate to the secondary integrated display platform includes reducing power to the portion of the display device at the secondary integrated display platform.

7. The system of claim 1, wherein operationally limiting a portion of the display device proximate to the secondary integrated display platform includes reducing the refresh rate of a display portion of the secondary integrated display platform.

8. The system of claim 1, further comprising:
   the dynamic thermal management system to determine individual thermal profiles for each of the primary integrated display platform and the secondary integrated display platform in the information handling system.

9. The system of claim 1, further comprising:
   the processor decreases the thermal profile threshold level in accordance with lessened thermal dissipation associated with the first relative orientation.

10. A computer-implemented method for dynamic thermal management of an information handling system having a passive cooling system and a first integrated display platform hinged to a secondary integrated display platform, comprising:
    determining, via a processor executing instructions, a thermal profile of the information handling system with respect to a thermal threshold level;
    determining an operating state rank of a first software application relative to a second software application;
    determining to locate a software application display window based on a first relative orientation of the first integrated display platform to the secondary integrated display platform from a plurality of orientation sensors, the operating state rank, and whether the thermal profile of the information handling system reaches the thermal threshold level; and
    operationally limiting a portion of a display device proximate to the secondary integrated display platform.

11. The method of claim 10, wherein first relative orientation is selected from a plurality of orientation modes including at least a laptop mode, a book mode, and a double tablet mode.

12. The method of claim 10, further comprising:
    determining the thermal threshold level based on the first relative orientation of the first integrated display platform to the secondary integrated display platform.

13. The method of claim 10, further comprising:
    locating the software application on a display device proximate to the secondary integrated display platform if the software application is determined to have a lower priority operating state rank than another software application running on the information handling system and if the thermal profile reaches the thermal threshold.

14. The method of claim 13, further comprising:
    suspending the software application having the lower priority operating state rank.

15. The method of claim 13, wherein operationally limiting a portion of a display device proximate to the secondary integrated display platform includes reducing refresh rate.

16. The method of claim 13, further comprising:
    changing the thermal profile threshold level in accordance with improved or lessened thermal dissipation associated with the first relative orientation.

17. An information handling system comprising:
    a primary integrated display platform and a secondary integrated display platform attached via a hinge;

a passive cooling system;

a processor executing instructions for a dynamic thermal management system to determine a thermal profile of the information handling system;

the processor to determine a first relative orientation of the primary integrated display platform to the second integrated display platform from a plurality of orientation sensors;

an application window locator system for determining a location of a software application display window of a first software application running on the information handling system on the primary integrated display platform or the secondary integrated display platform;

wherein the application window locator system locates the software application, having a lower priority operating state rank than another software application running on the information handling system, on a display device proximate to the secondary integrated display platform if the thermal profile reaches the thermal threshold.

18. The system of claim 17, further comprising:

a camera integrated in the information handling system to detecting a viewer location and further determine the designation of the primary integrated display platform.

19. The system of claim 17, wherein the dynamic thermal management system further determines to suspend the software application having the lower priority operating state rank if the thermal profile reaches a second thermal threshold level.

20. The system of claim 17, wherein the dynamic thermal management system further determines to reduce the power to a portion of a display device proximate to the secondary integrated display platform.

* * * * *